US012340712B1

(12) United States Patent
Saijo et al.

(10) Patent No.: US 12,340,712 B1
(45) Date of Patent: Jun. 24, 2025

(54) DYNAMIC USER INTERACTION ENVIRONMENT

(71) Applicant: Yamaha Motor Corporation, USA, Cypress, CA (US)

(72) Inventors: Hiroshi Saijo, Irvine, CA (US); Ernesto Estrada, Jr., Whittier, CA (US)

(73) Assignee: Yamaha Motor Corporation, USA, Cypress, CA (US)

( * ) Notice: Subject to any disclaimer, the term of this patent is extended or adjusted under 35 U.S.C. 154(b) by 224 days.

(21) Appl. No.: 16/858,322

(22) Filed: Apr. 24, 2020

Related U.S. Application Data

(60) Provisional application No. 62/839,578, filed on Apr. 26, 2019.

(51) Int. Cl.
G09B 5/12 (2006.01)
G06T 19/00 (2011.01)
G09B 5/06 (2006.01)

(52) U.S. Cl.
CPC .............. G09B 5/12 (2013.01); G06T 19/006 (2013.01); G09B 5/065 (2013.01)

(58) Field of Classification Search
None
See application file for complete search history.

(56) References Cited

U.S. PATENT DOCUMENTS 5,929,848 A * 7/1999 Albukerk ............... G09B 5/065
340/4.62
9,329,469 B2 * 5/2016 Benko ................. G02B 27/017
9,811,992 B1 * 11/2017 Neuvirth-Telem ..........................
G08B 21/0476
10,846,517 B1 * 11/2020 Bulusu ................. G06V 40/161
2006/0188230 A1 * 8/2006 An ........................ G09B 29/008
386/227
2007/0256017 A1 * 11/2007 Nishimura .............. G09F 27/00
715/730
2011/0041086 A1 * 2/2011 Kim ...................... G06F 3/0488
715/764
2016/0011733 A1 * 1/2016 Mann ....................... G09B 5/06
715/709
2016/0327403 A1 * 11/2016 Chang ................. G06F 16/9535
2017/0153787 A1 * 6/2017 Chowdhary ........... G06T 19/003
2017/0188928 A1 * 7/2017 Tanriover ............... A61B 5/165
2018/0150698 A1 * 5/2018 Guttmann .............. G06V 20/41
2018/0243611 A1 * 8/2018 Bradley ............. A63B 71/0054

(Continued)

FOREIGN PATENT DOCUMENTS

WO WO-2019217987 A1 * 11/2019 ......... G06K 19/0716

Primary Examiner — Justin S Lee
(74) Attorney, Agent, or Firm — Knobbe, Martens, Olson & Bear, LLP

(57) ABSTRACT

Systems and methods for management of user interactions in a physical facility utilizing a studio controller and user interaction configuration are provided. A physical facility can include or define a physical space in which one or more users interact with devices, objects, or services within the physical space. Various devices can capture interaction data. The facility, via the studio controller or other process, can then process the received interaction data according to a configuration or other processing instructions. The facility, through the studio controller or other process, can generate, or cause to be generated, various outputs based on the processed interaction data.

20 Claims, 15 Drawing Sheets

(56) References Cited

U.S. PATENT DOCUMENTS

| | | | |
|---|---|---|---|
| 2019/0079591 A1* | 3/2019 | Glaser | G06F 3/0346 |
| 2020/0082604 A1* | 3/2020 | Kim | G06T 15/503 |
| 2020/0273360 A1* | 8/2020 | Swierkowski | G09B 5/065 |

* cited by examiner

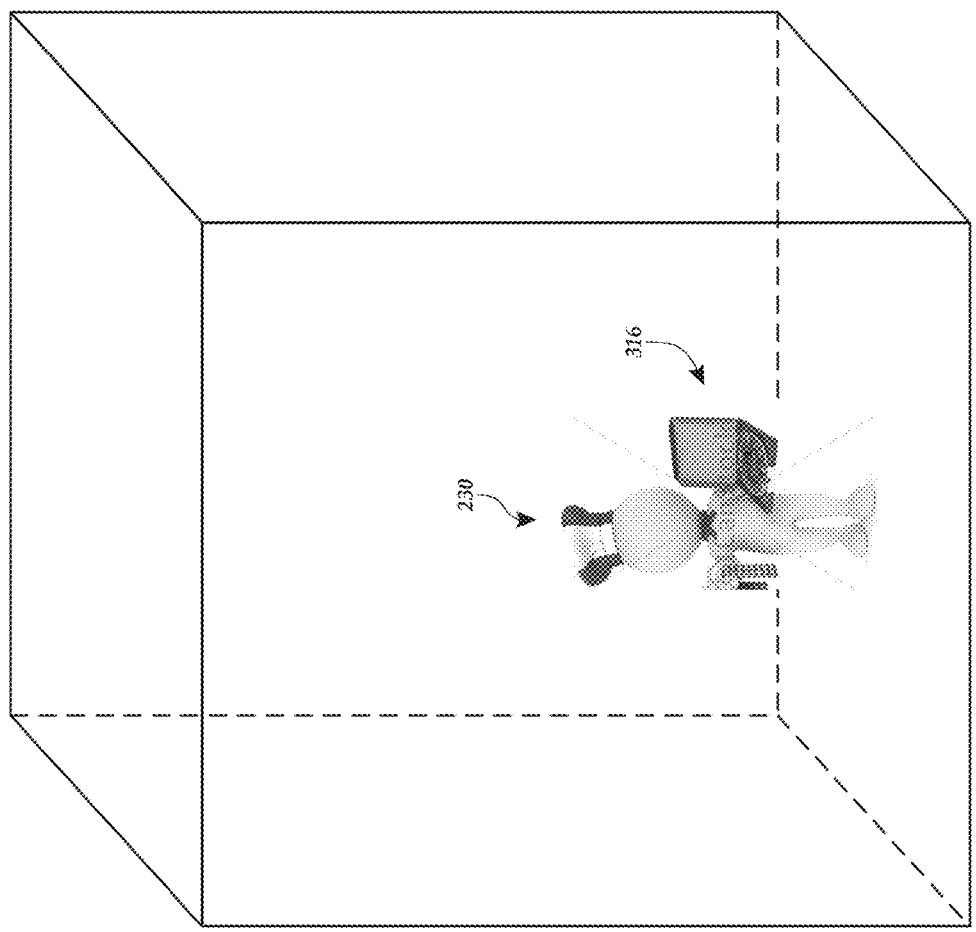

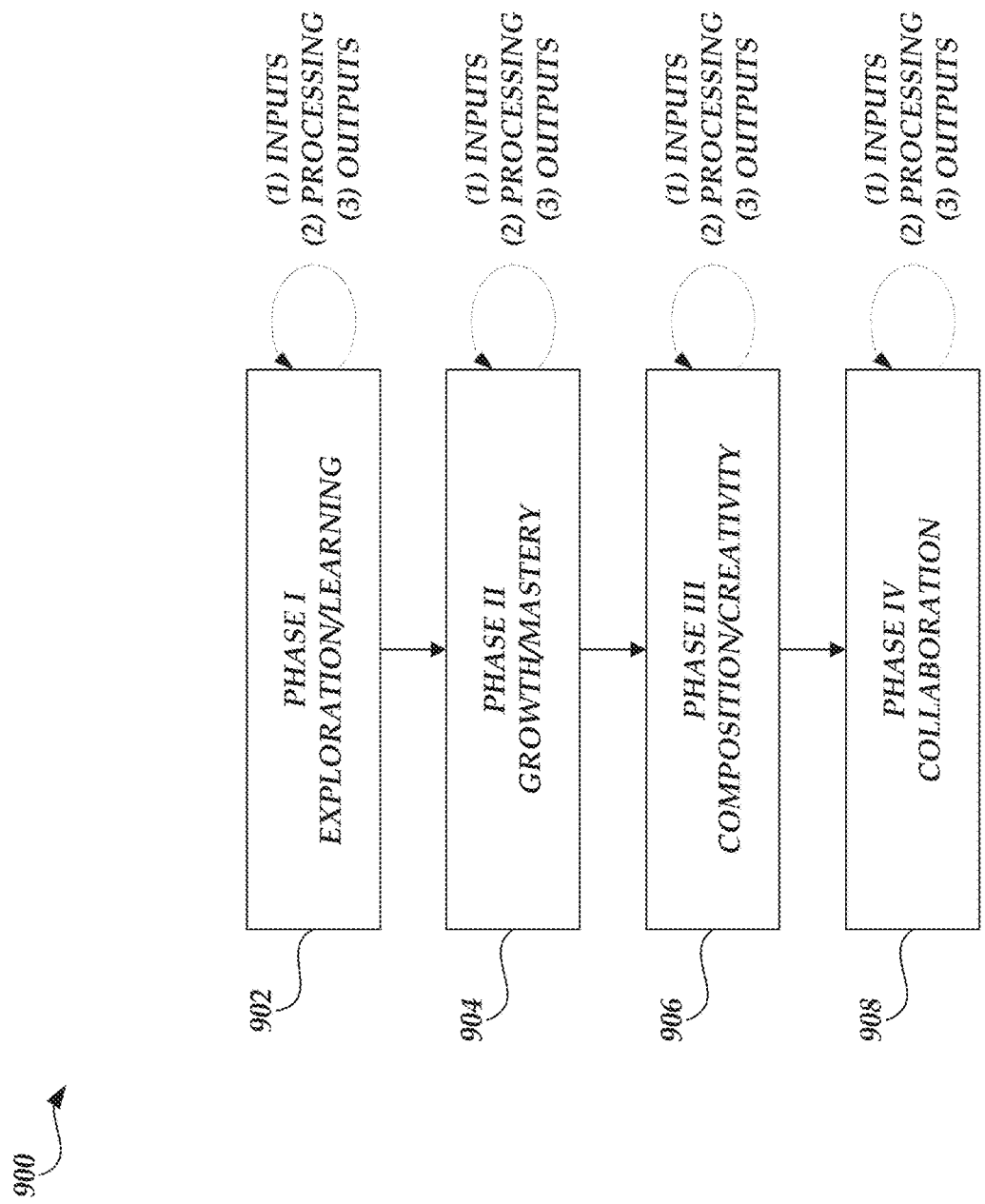

DYNAMIC USER INTERACTION ENVIRONMENT

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as "data centers," may include a number of interconnected computing systems to provide computing resources to users of the data center. The data centers may be private data centers operated on behalf of an organization or public data centers operated on behalf, or for the benefit of, the general public.

In some environments, computing devices that can also communicate via the communication network can include devices having a primary function as a computing device, such as a desktop personal computer. In other environments, at least some portion of the computing devices that communicate via the communication network can include embedded devices or thin devices that have at least one alternative primary function, such as specific purpose devices or appliances having a separate primary purpose (e.g., a thermostat or display) while also providing at least limited computing functionality.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

FIG. 3G is a schematic diagram of a studio of FIG. 2A used with a kitchen appliance;

FIG. 9 is a block diagram of illustrative components of the configuration of user interaction in facilities in accordance with an illustrative embodiment.

DETAILED DESCRIPTION

Figure 1:
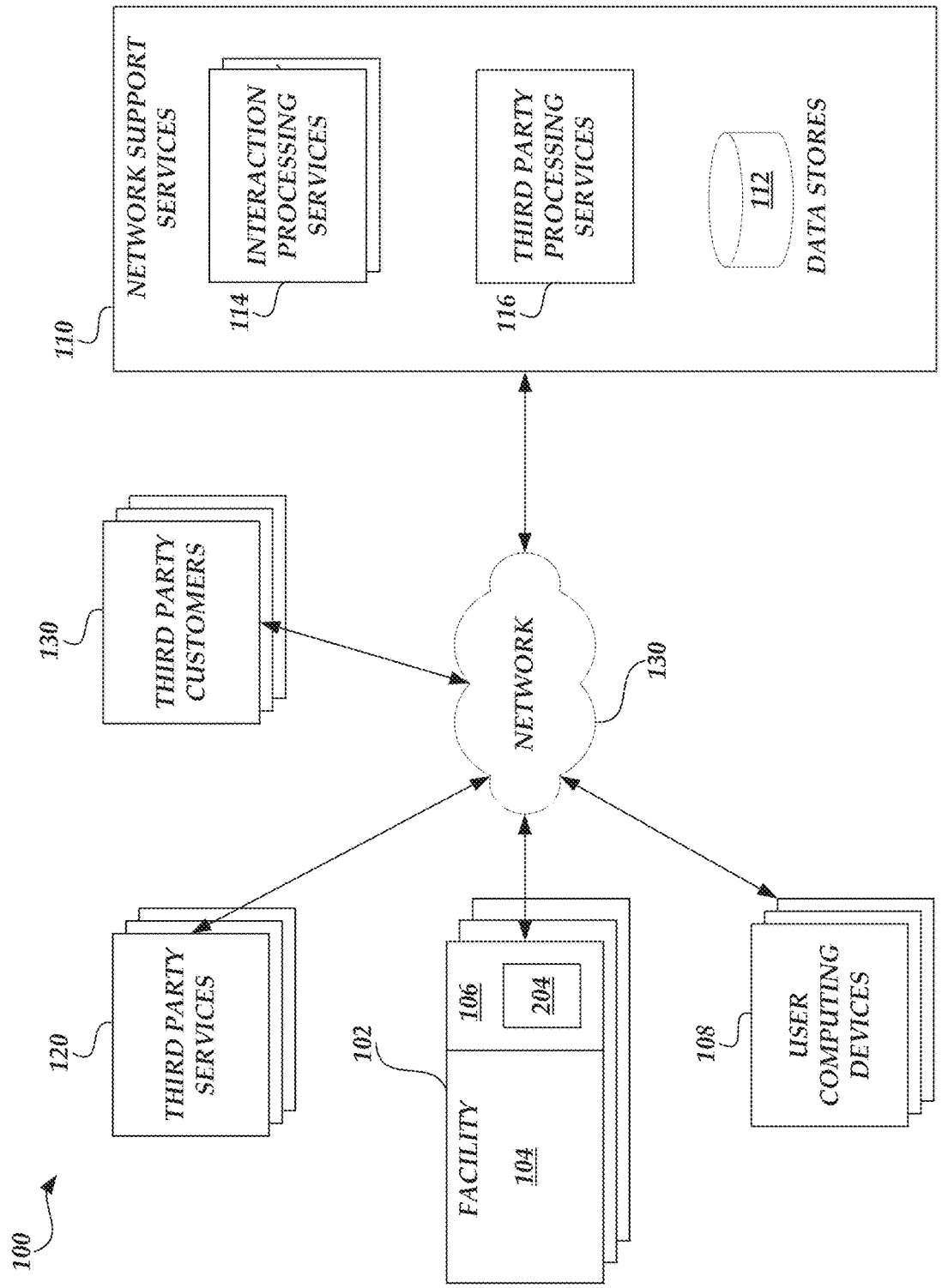
FIG. 1 is a block diagram of a user interaction environment that includes one or more facilities, one or more user devices, one or more third-party services, one or more third-party customer networks and a set of network support services according to one embodiment.

Generally described, the present application corresponds to the management of user interactions in a physical facility. More specifically, aspects of the present application correspond to the utilization of a studio controller and user interaction configuration to collect information about user interactions with devices, physical objects, athletic activities, prescribed actions, or services in a physical facility, process the collected information and generate a set of outputs corresponding to the processed information. Illustratively, the physical facility can include or define a physical space in which one or more users interact with devices, objects, or services within the physical space. The interaction data may include a measurement of physical activity, interaction, emotion or response, environmental information and the like. The captured interaction data can be collected through computing devices, such as input devices or sensors, that are included in the physical space. The captured interaction data can also be collected from network-based sources or third-party services that form the basis of the user interaction (e.g., a video game) or provide some information/data (e.g., historical information or profile information). For example, identified users at a physical location may be associated with a profile or have access to personal information that can be utilized by the studio controller for personalization of the user experience, generally referred to as personalization information. More specifically, the studio controller can receive image data, playlists, display preference data, language preference data, sensitivity information, and the like that can be utilize in various aspects as described herein. The personalization information may be provided by network-based services associated with the physical locations, one or more third-party services, or one or more user devices associated with the user (e.g., in physical proximity to the user). The studio controller can function to receive the interaction data or facilitate the transmission of interaction data for further processing.

The facility, via the studio controller or other process, can then process the received interaction data according to a configuration or other processing instructions. Illustratively, the processing of the interaction data can correspond to the type of interaction data and optionally to the intended/specified purpose of the elicited interaction. For example, audio and video data generated from sensors in the physical facility can be processed in a manner to characterize emotion of an identified user. In another example, the user interaction data, such as a measure of physical movement, can be approximated or converted, or otherwise transformed, into one or more formats for application into another type of interaction, such as video game credits, growth/development of avatars, generation of media files, and the like. More specifically, in the context of gaming, such approximation, transformation or conversion can be referred to as a gamification of the user interaction at the physical facility into credits, achievements, etc. within one or more games, such as online games or multi-user interactions. Still further, in another example, interaction data can be summarized or statistically processed for archiving or profiling purposes. In still another example, unique information provided (or otherwise obtained) can be utilized as part of the processing of the interaction data. In one embodiment, audio data from a playlist can be integrated into captured video interaction data to generate a more unique output that can be delivered to the user or transmitted to other services. In another embodiment, images from the personalization information can be outputted in physical location or blended into the outputs provided at the physical location (e.g., one or more outer walls of the physical location displaying a "favorite location," "favorite setting," or favorite individuals). Other types of processing or combination of processing can be included in accordance with aspects of the present application.

In addition to the collection of interaction data and the processing of the interaction data, the facility, through the studio controller or other process, can generate, or cause to be generated, various outputs based on the processed interaction data. For example, audio or video data can be generated to a set of video display screens incorporated in the physical facilities to provide sensory-based feedback regarding an evaluation or processing of the collected interaction data. In another example, the studio controller can transmit information to a network-based service or set of services to facilitate additional processing, archiving or transmission to additional services or components. More specifically, a controller can generate outputs to one or more social media networks to promote user interactions within the physical facility. As referenced above, in some embodiments, the outputs can include a combination of captured or collected user interaction information in combination with personalization information, such as custom videos/audio tracks, integrated images or sounds, preferable color palettes, and the like. Still further, the social network service can provide information regarding such posting (e.g., "clicks" or "likes") that can result in benefits to the user at the physical facility. Still further, in another example, one or more outputs may be generated in the physical facility from third-party services or user devices corresponding to the processed interaction data or in an effort to elicit additional interaction (e.g., a motivational media clip generated by user devices).

In accordance with some aspects of the present application, the inputs, processing and outputs related to user interaction can be configured or defined by the provider of the physical facility or various third-parties, such as third-party customer. Individual aspects of the collection of inputs to form the interaction data, processing of the interaction data and generation of outputs can be specified via an interface, such as an application protocol interface (API), or other form of specification of configuration information. For example, a third-party customer may wish to utilize the physical facility to collect interaction data related to specific uses of a device, object or service. The third-party customer can the provide configuration information that identifies how interaction data is collected and processed and the outputs related to the processed interaction data not only to the physical facility but to the third-party customer. The configuration information may be template-based in which one or more default configurations can be specified and adjusted. The third-party service can also provide access to preference information for the set of users or individual users, such as for customized individual experiences or co-branded user interaction. Additionally, the configuration information can further include processing rules that allow for the dynamic adjustment of configurations.

In accordance with still further aspects of the present application, the configuration of the inputs, processing and outputs related to user interaction can further be defined or organized according to a set of developmental phases or learning categories. Illustratively, each phase can specify the set of inputs, processing and outputs, which may vary at least in part between phases/learning categories. Additionally, the developmental phases can be considered to be sequential in nature in which a predecessor phase can include outputs to elicit additional interaction to facilitate transition to a subsequent phase or criteria that can determine when progress to a subsequent phase is acceptable. Illustratively, the set of phases can include a first phase related to introduction and general learning of an identified concept, a second phase related to development/mastery of the identified concept, a third phase related to content creation/composition and creative development of the identified concept and a fourth phase related to collaboration(s) with other users relating to the identified concept. As described above, the configuration of the inputs, processing and outputs related to user interaction can be specified via templates or structured documents including individual definitions for at least one of the established phases of interaction.

Although aspects of some embodiments described in the disclosure will focus, for the purpose of illustration, on specific implementations of the physical facilities, services and other illustrative user interactions, one skilled in the relevant art will appreciate that the examples are illustrative only and are not necessarily intended to be limiting. Still further, although various exemplary user interactions are used herein, the application of one or more aspects of the present application are not limited to such examples and that additional or alternative user interactions should be considered within the scope of the present application.

FIG. 1 is a block diagram depicting an illustrative user interaction environment 100 including multiple physical facilities 102 and user devices 108 in communication with network-based services 110. The user interaction environment 100 further includes one or more third-party services 120 that are operable to provide information or receive information via a network 125. The user interaction environment 100 also includes one or more third-party customer networks that are operable to define the configuration of the user interaction at the user physical facilities 120 as described herein.

While user devices 108 are shown as a group within FIG. 1, user devices 104 individually or as a grouping may be geographically distant, and independently owned or operated. For example, user devices 108 could represent a multitude of client devices within a physical facility 102. In one embodiment, the user devices 108 can be classified or certified in a manner by the facility to limit what user devices 108 are permitted to be used in the context of the physical facility 102 or that otherwise provide data to the physical facility. In another example, user devices 108 could be part of a grouping of multiple of devices external to a physical facility 102 but otherwise providing or receiving interaction data. Similarly, while one set of illustrative components is shown to represent the content management network-based services 110, multiple instances of each component may be present within the content management system 110, and such components may be located within geographically diverse areas (e.g., globally, continentally, or regionally), in order to provide a wide geographical presence for the network-based services 110. Likewise, third-party service providers 120 and third-party customers 130 represent any number of computing devices or other components utilized by a content provider to facilitate the delivery, processing and storage of content via the network 125.

Network 125 may be any wired network, wireless network, or combination thereof. In addition, the network 125 may be a personal area network, local area network, wide area network, cable network, satellite network, cellular telephone network, or combination thereof. In the example environment of FIG. 1, network 125 is a global area network (GAN), such as the Internet. Protocols and components for communicating via the other aforementioned types of communication networks are well known to those skilled in the art of computer communications and thus, need not be described in more detail herein. While each of the physical facilities 102, user computing devices 108, third-party services 120, third-party customers 130, and network-based services 110 is depicted as having a single connection to the network 125, individual components may be connected to the network 125 at disparate points.

User computing devices 108 may include any number of different computing devices capable of communicating with the physical facilities 102, network-based services 110 and third-party services 120. For example, individual accessing computing devices may correspond to a laptop or tablet computer, personal computer, wearable computer, server, personal digital assistant (PDA), hybrid PDA/mobile phone, mobile phone, electronic book reader, set-top box, camera, appliance, controller, digital media player, and the like. Each user device 108 may optionally include one or more data stores (not shown in FIG. 1) including various applications or computer-executable instructions, such as web browsers, used to implement the embodiments disclosed herein. Illustrative components of a user computing device 108 will be described with regard to FIG. 5. In one embodiment, the client computing devices 102 can be referred to an Internet of Things ("IOT") devices representative of a class of devices in which computing functionality can be embedded within devices having at least one additional alternative functionality. Examples include, but are not limited, household appliances, controls for various other devices, consumer goods, and the like.

In accordance with embodiments, the network-based services 110 includes one or more servers for implementing interaction process services 114 and third-party processing services 116 as described herein. Such interaction process services 114 and third-party processing services 116 can be implemented to facilitate the configuration of communications between the physical facilities 102, the user devices 108 and third-party services 120. Illustrative components of the interaction process services 114 and third-party processing services 116 will be described with regard to FIGS. 6 and 7.

It will be appreciated by those skilled in the art that the network-based services 110 may have fewer or greater components than are illustrated in FIG. 1. Thus, the depiction of the network-based services 110 in FIG. 1 should be taken as illustrative. For example, in some embodiments, components of the network-based services 110, such as the interaction process services 114 or third-party processing services 116, may be executed by one more virtual machines implemented in a hosted computing environment. A hosted computing environment may include one or more rapidly provisioned and released computing resources, which computing resources may include computing, networking or storage devices. Still further, the network-based services 110 can include various data stores 112 for collecting user interaction data, configuration information or other information associated with various embodiments of the present application. The data stores 112 may be implemented in a centralized or distributed manner.

Figure 2A:
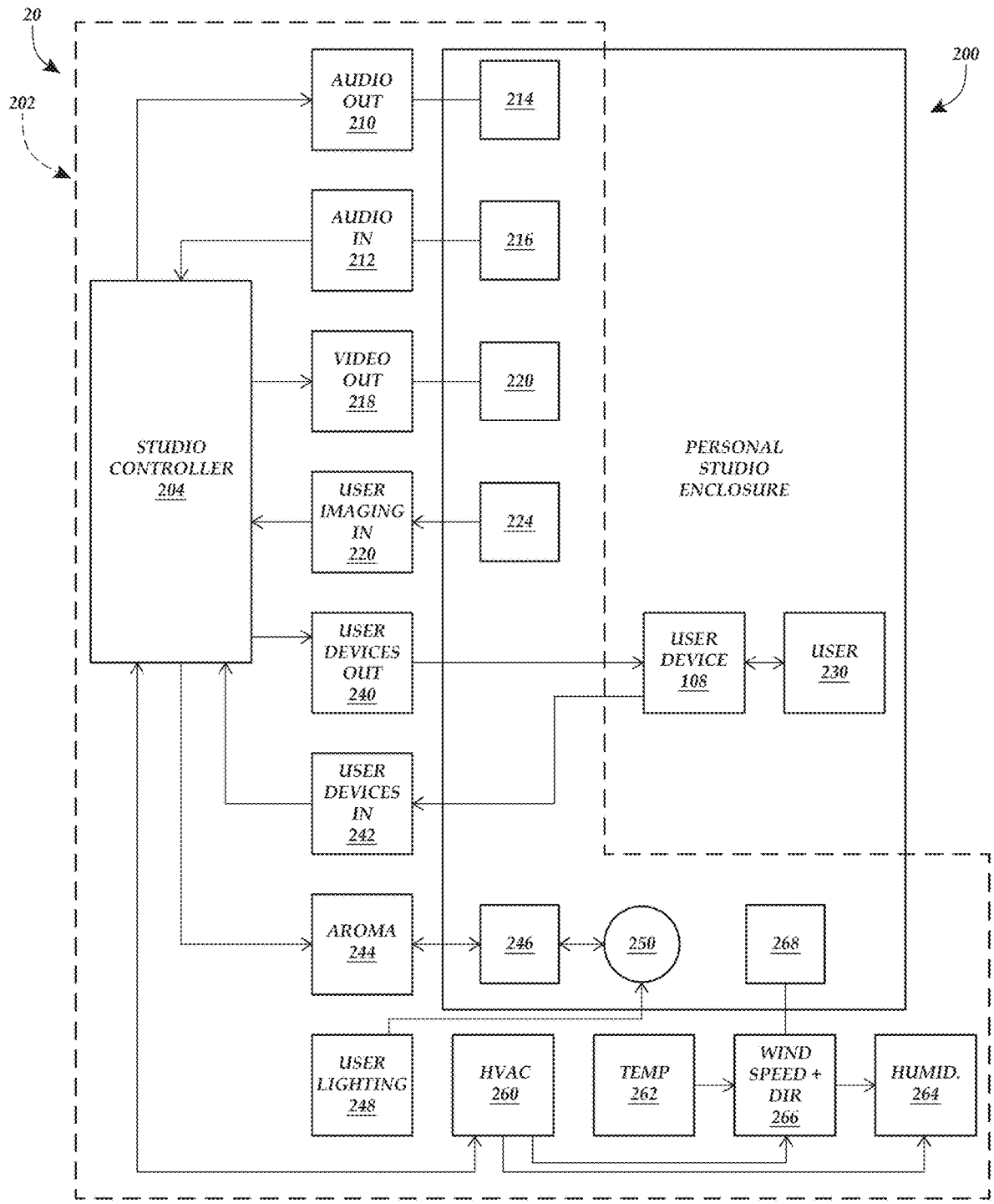
FIG. 2A is a schematic diagram of an embodiment of a personal studio, including a studio enclosure and a studio controller system.

With reference to FIG. 2A, the physical facilities 102 can include a studio enclosure 200 and a studio control system 202. The personal studio enclosure 200 can be generally in the configuration of a room having a plurality of walls, a floor, and a ceiling, and a door (not shown) for allowing users to enter and exit the enclosure. The floors and walls can be flat with right angled corners, rounded corners or large radius (greater than twelve inches or more) curved corners.

The enclosure, in some embodiments, can be integrated with a display system integrated with the walls, floor and ceiling such that the studio 200 can provide an optical representation of a desired environment, selected or composed for a user. Optional configurations of display hardware that can be incorporated into the personal studio enclosure 200 are described below with reference to FIGS. 2C-2E.

The studio control system 202 can include various devices and features for creating a selected and/or customizable environment within the personal studio enclosure 200. Some of the hardware of the control system 202 can be located outside the personal studio and some components can be disposed within the studio enclosure 200. Thus, the system 202 is illustrated as overlapping with a portion of the personal studio enclosure 200.

The studio control system 202 can include a studio controller 204 and one or more subsystems for providing outputs and/or input (e.g., interaction data) from the personal studio enclosure 200. For example, in some embodiments, the studio control system 202 can include audio output 210 and audio input 212 modules. For example, the audio output module 210 can include one or more speakers 214 configured to output audio into the personal studio enclosure 200. Optionally, in some embodiments, the audio output module 210 can include an audio receiver and associated electronics for producing amplified mono, stereo, surround, and/or 3D sound output into the personal studio enclosure 200. Thus, in some embodiments, the audio output module 210 can be connected to four, six, or any number of speakers necessary for providing the desired audio experience to a user within the personal studio enclosure 200. In some embodiments, the speakers 214 are flat panel speakers designed for minimal visual and physical intrusion into the personal studio enclosure 200. In some embodiments, the speakers 214 can be configured to direct focused beams of audio directly at a user within the personal studio enclosure 200. Other types of speakers 214 can also be used.

The audio input module 212 can be connected to one or more microphones 216 positioned to detect and convert sound within the personal studio enclosure 200 and transmit a signal representative of the detected sound to the audio input module 212. The audio input module 212 can include known signal processing electronics and/or amplifiers for processing the signals from the microphones 216. In some embodiments, the audio out module 210 and the audio in module 212 can be both contained within a single audio processing device such as a commercially available sound card for use with a personal computer, standalone audio receivers, audio mixers, or other types of known hardware.

The studio control system 202 can also include a video output or display subsystem 218. The subsystem 218 can include one or more display units 220 configured for providing a video display to a user within the personal studio enclosure 200. The displays 220 can be any type of displays. Examples of different types of display systems that can be used are described in greater detail below with reference to FIGS. 2C-2E.

The video output subsystem 218 can include any type of known hardware for driving the displays 220 such as a video card for use with a personal computer or other external types of video drivers for driving one or more display units. In some embodiments, where a large number of display units 220 are used, the video output subsystem 218 can include a separate display work station designed for driving the number of display units 220. Further, in some embodiments, where the amount of video media to be displayed by the display units 220 is large, the video output subsystem 210 can be configured to receive a direct feed of the media to be displayed from a media library, or it can render the desired video from a 3D virtual environment so as to avoid creating a throughput bottleneck in the studio controller 204. Other configurations can also be used.

The studio control system 202 can also include a user imaging input subsystem 222. The user imaging input subsystem 222 can include one or more imaging devices 224 which can be in the form of cameras, motion capture cameras, thermal imaging devices, gesture recognition systems, facial recognition systems, and/or other types of tracking systems. In some embodiments, the user imaging input subsystem 222 can be configured to receive a limited set of input data, such as a subsystem specifically configured to receive video imaging data. In such embodiments, the user imaging input subsystem 222 could also be referenced as a video in subsystem. Optional configurations of the user imaging subsystem 222 are described below with reference to FIG. 2B. In some embodiments, the user imaging input subsystem 222 can include a commercially available video card for use in a personal computer or by way of a separate workstation including one or more separate computers running the appropriate software for driving the desired hardware.

In some embodiments, video recording of a user might be performed by one separate computer and motion capture might be executed by another separate computer. One of ordinary skill in the art can determine the type and number of hardware configurations necessary for driving the desired devices.

In some embodiments, the user imaging input system 222 can be configured to generate an animated wire frame model of a user 230. Additionally, the user imaging input system 222 or the studio controller 204 can be configured to combine two-dimensional video imagery of the user captured with cameras with an animated wire frame of the user by layering the two-dimensional imagery of the user onto the wire frame and thereby creating a virtual three-dimensional representation of the user 230. Further, such a three-dimensional representation can be recorded and stored for review by the user or others.

The user imaging subsystem 222 can also include infrared sensors or cameras for obtaining temperatures of the interior or objects within the interior of the personal studio enclosure 200. For example, the user imaging subsystem 222 can include thermal cameras for detecting surface temperatures of a user 230 and a user device 108 within the personal studio enclosure 200, during use. Optionally, in some embodiments, some such thermal sensors or cameras can be oriented and controlled so as to detect surface temperatures of a user's face during use. Temperatures and changes in temperatures and temperature distribution over a user's face during use can be used as part of an estimation of a user's physical and/or emotional state.

The user imaging subsystem 222 can also include additional cameras or can be configured to task one or more of the cameras 224 to capture facial expressions of the user 230 during use. For example, the subsystem 222 can include dedicated cameras and/or controlled, aimed, in orientations and focal lengths to photograph a user's face at higher resolution so as to record facial expressions of the user, at a resolution and frame rate sufficient to show typical facial expressions, as well as micro expressions. Other types of imaging sensors and cameras can also be used.

The studio control system 202 can also include a user device output subsystem 240 configured for providing output to one or more user devices 232 which can be disposed within the personal studio enclosure 200 and with which a user 230 can interact. Such a user device can include actuators and/or circuitry for receiving settings from the studio control system 202. For example, in the context of exercise devices, the user device 232 can receive instructions for load settings, speed, resistance, vibration, tactile feedback, color, or other settings.

The studio control system 202 can also include a user device input subsystem 242 for receiving output from one or more user devices 108 or components in communication with a user device 108. For example, in the context of user devices 108 that are exercise devices, the subsystem 242 can be configured to receive telemetry data, such as speed, cadence, power, and the like. The subsystem 242 can also be configured to receive information regarding settings of the device such as resistance settings, incline settings, difficulty settings, and the like. Still further, the subsystem 242 can be configured to receive information regarding physiological measurements related to the user, such as heart rate of the user 230, respiration rate, vibrations, pressures, forces, proximity signals, accelerations, perspiration, exertion levels, pain indications, or other data indicative of, or characterization, a user's individual vital settings. Illustratively individual sensors or components may be configured to directly transmit at least a portion of the data to the input subsystem 242 or alternatively, via a user device 108 or other intermediary device. The user device output and input subsystems 240, 242 can be connected to the studio controller 204.

The personal studio control system 202 can also include an aroma subsystem 244. The aroma subsystem 244 can include an aroma discharge device 240 disposed within the personal studio enclosure 200 and configured to discharge substances that carry an aroma. For example, in some embodiments, the aroma subsystem 244 can include a plurality of aromatic oils disposed within the device 246 along with a vaporizer for vaporizing the oils, and responsive to instructions from the studio controller 204. In use, the studio controller 204 can issue a command to create a predetermined aroma in the enclosure 200. The aroma subsystem 244 can be configured to, in response to the instruction, vaporize one or more of the aromatic oils disposed within the subsystem 244, to thereby generate the predetermined aroma within the personal studio enclosure 200.

In some embodiments, the aroma discharged by the aroma subsystem 244 can be correlated with an environment displayed by the video output system 218. For example, when the video output system 218 is displaying an environment resembling a meadow with wildflowers, the studio controller 204 can issue a command to the aroma subsystem 244 to generate an aroma of wildflowers and the aroma subsystem 244 can, in response, vaporize an aromatic oil having the aroma of wildflowers.

The personal studio control system 202 can also include a user lighting subsystem 248 configured to provide supplemental lighting to the interior of the personal studio enclosure 200. For example, in some embodiments, the user lighting subsystem 248 can include one or more light emitting devices 250 such as light bulbs or color controllable light sources such as RGB LED lighting devices. Such lighting devices can be distributed within an area of the personal studio enclosure 200 and configured to aim supplemental light at or around the user 230. This can provide optional additional benefits because although the video output subsystem 218 will generate a significant amount of ambient light within the personal studio enclosure 200, the level of light impacting the user 230 may not be sufficient or satisfactory to a user 230. Thus, the user lighting subsystem 248 can be used to provide supplemental light that can be adjusted to the satisfaction of the user 230. Additionally, where the lighting devices 250 are color controllable devices, the color of the light emitted by the devices 250 can be coordinated with the environment displayed by the video out subsystem 218. For example, if the video out subsystem 218 is displaying an environment resembling a meadow with wildflowers on a sunny day, the user lighting subsystem 248 can control the lighting devices 250 so as to emit a light having a temperature similar to or approximately the same as the color of sunlight, for example, the color of the sunlight displayed by the video out subsystem 218.

The personal studio control system 202 can also include an environmental control subsystem 216 which can be in the form of a digitally controllable heating ventilation and air conditioning (HVAC) system. The environmental control system 260 can be configured to provide temperature, wind speed, wind direction, and humidity control of the air within the personal studio enclosure 200. For example, the climate control system 260 can be operably connected to the studio controller 204 and can function to operate as a thermostat for temperature control of the personal studio enclosure 200 as well as for humidity level and additionally for controlling wind speed which can be proportional to a fan speed within the HVAC system 260.

The system 260 can be configured to control wind direction louvers and/or valves for connecting and disconnecting ducts within the personal studio enclosure 200. For example, the environmental control system 260 can include a temperature control unit 262 which can include electric or natural gas system for increasing the temperature of air within the personal studio enclosure 200 and an air conditioning heat exchanger for reducing the temperature of the air within the personal studio enclosure 200. The environmental control system 260 can also include a humidity control unit 264 which can include evaporative or an active vaporization system for adding water vapor into the air flowing through the system 260. The system 260 can also include a wind speed and direction unit 266 which can include a duct work and one or more electric fans for delivering a flow of air into the interior of the personal studio enclosure 200. In FIG. 2A, the duct work is identified by reference numeral 268.

The duct work 268 can include a manifold portion enclosing heat exchangers within the temperature unit 262 and a water vapor discharge of the humidification unit 264. For example, the duct work 268 can be configured to draw air in from within the personal studio enclosure 200, pass the incoming air across the heating and cooling heat exchangers of the temperature unit 262 and the discharge of the humidification unit 264, then direct air back into the personal studio enclosure 200, operating in a well-known principle of operation for HVAC systems.

Although not illustrated in FIG. 2A, the wind speed and direction unit 266 can include actuators and valves as well as a number of different discharge ports around the side walls, ceiling, and floor of the personal studio enclosure so as to provide optional sources of air flow and thus "wind" within the personal studio enclosure 200.

The temperature, wind speed, wind direction, and humidity controlled by the system 260 can be coordinated with the environment displayed by the video out subsystem 218. For example, if the environment displayed by the video out subsystem 218 corresponds to what would be seen by a surfer while surfing on a wave, the climate control system 260 can control the temperature unit 262, the wind speed and direction unit 266, and the humidification unit 264 to provide the temperature, wind, and humidity that would be experienced by a surfer during a surfing activity. In some embodiments, the wind and speed direction unit 266 can generate a wind speed and direction approximate to the wind speed and direction corresponding to the movement of a surfer represented by the video out unit 218.

Figure 2B:
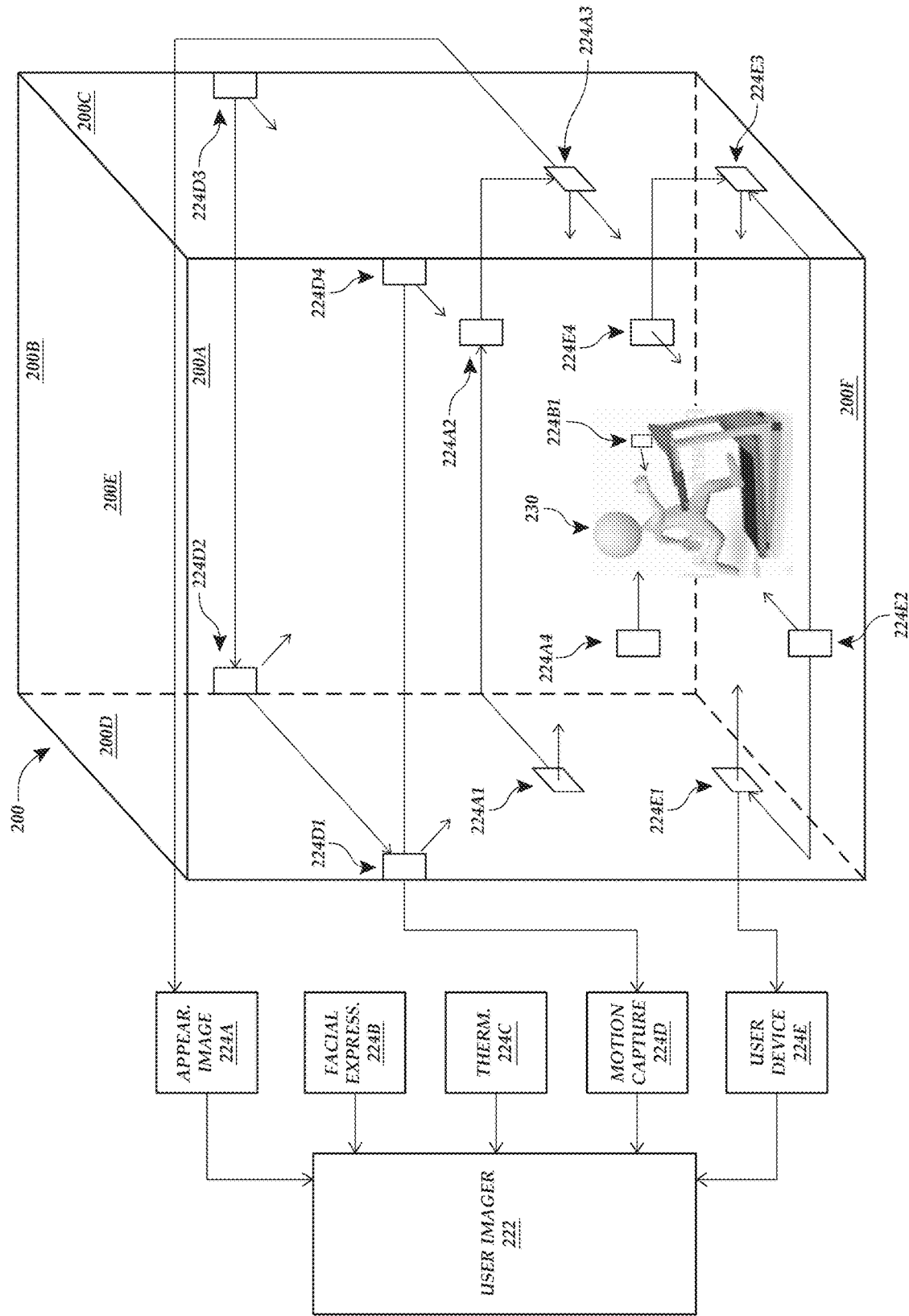
FIG. 2B is a schematic diagram of a user imaging system that can be used with the studio of FIG. 2A.

FIG. 2B illustrates a further embodiment of the user imager subsystem 222. As noted above with reference to FIG. 2A, the user imager subsystem 222 can incorporate a variety of different techniques for imaging a user 230 during use of the physical facilities 102, for example, while interacting with a user device 108. In the illustrated embodiment, the user device 108 is a treadmill in accordance with an athletic activity, however, this is merely one example of many different kinds of user devices that can be used in the studio 20.

The user imager subsystem 222 can be configured to capture imaging data related to one or more detectable aspects of the user 230 within the personal studio enclosure 200 during use of the studio 20. For example, the user imager subsystem 222 can receive thermal imaging data related to thermal aspects of a user 230 (e.g., different temperature settings). In another example, the user imager subsystem 222 can receive video imaging data related to visible appearance characteristics of the user 230. As illustrated in FIG. 2B, the personal studio enclosure includes a side wall 200A on the right side of the user 230, a side wall 200B on the left side of the user 230, a front wall 200C disposed in front of the user 230, and a rear wall 200D disposed behind the user 230. The enclosure 200 can also include a ceiling 200E disposed above the user 130 and a floor 200F disposed below the user 230. The user imager system can include one or more cameras, described below, mounted to any of the walls 200A-200D, the ceiling 200E, or the floor 200F.

In some embodiments, the user imager subsystem includes an appearance image subsystem 224 configured to capture aspects of visual images of the user 230 during use. In the illustrated embodiment, the appearance image subsystem 224 includes four cameras 224A1, 224A2, 224A3, and 224A4 mounted to the walls 200A-200D. These cameras can be any type of motion video camera, and some embodiments include wide angle lenses so as to reliably capture images of the user 230 regardless of the location of the user 230 within the personal studio enclosure 200. Other numbers of cameras can also be used. The appearance image subsystem 224 can be configured to record video from one or all of the cameras 224A1-224A4 during use.

The user imager subsystem 222 can also include a facial expression recognition subsystem 224B. In some embodiments, the facial expression subsystem 224B can use video images from the cameras 224A1-A4 and/or an additional camera 224B1 mounted in closer proximity to the user 230 or having an appropriate lens for obtaining higher resolution images of the face of the user 230 for purposes of facial expression recognition. For example, the facial expression subsystem 224B can include an additional camera 224B1 mounted on the treadmill 108.

The user imager subsystem 222 can also include a thermal imaging subsystem 224C which can use any of the cameras noted above or additional cameras (not shown) to obtain thermal imaging of a user 230 and/or user device 108 during use, using known techniques.

The user imager subsystem 222 can also include a motion capture subsystem 224D. Motion capture systems typically require specific, high performance, higher frame rate cameras. Additionally, some motion capture systems require the user to wear markers (which have the appearance of ping-pong balls) at various points on their body in order to capture their motion. However, markerless tracking systems are also commercially available from companies such as Simi Reality Motion Systems, Eumotus, and iPiSoft. Additionally, one or more of these companies offer biomechanical motion tracking packages for visualizing movements of all the limbs of the user and providing output in various formats including Excel and Matlab. As such, the motion capture subsystem 224D could include cameras 224D1, 224D2, 224D3, and 224D4 for capturing the motion and movements of the user and all the user's limbs, using known, commercially available systems.

The user imager subsystem 222 can also include a user device imaging system 224E for capturing imagery specific to the user device 108. Optionally, as illustrated in FIG. 2B, the user device imaging subsystem 224E can include one or more cameras 224E1, 224E2, 224E3, 224E4, configured and oriented to provide better imaging of the user device 108. In some embodiments, the user device 108 might be a ball that can move and bounce freely around the personal studio enclosure 200, and thus other cameras and camera orientations can be used. Additionally, the cameras 224E1-224E4 can be configured and operated to capture images of the user device 108 in finer detail such that rotational movement, bouncing, deformation, vibration or other responses or movements of the user device 108 can be perceived in the imagery and/or recording thereof.

In some embodiments, the motion capture subsystem 224D and appearance image subsystem 224A, and facial expression subsystem 224 and/or the thermal subsystem 224C and the outputs thereof can be combined so as to produce an animated three-dimensional model of the user 230 during use of the studio which can be recorded and viewed later by the user or others. For example, the motion capture subsystem 224D can be used to create an animated wire frame of the user 230 and the appearance image subsystem 224A can be used to create an outer appearance of the wire frame. Such techniques are known in the art.

Figure 2C:
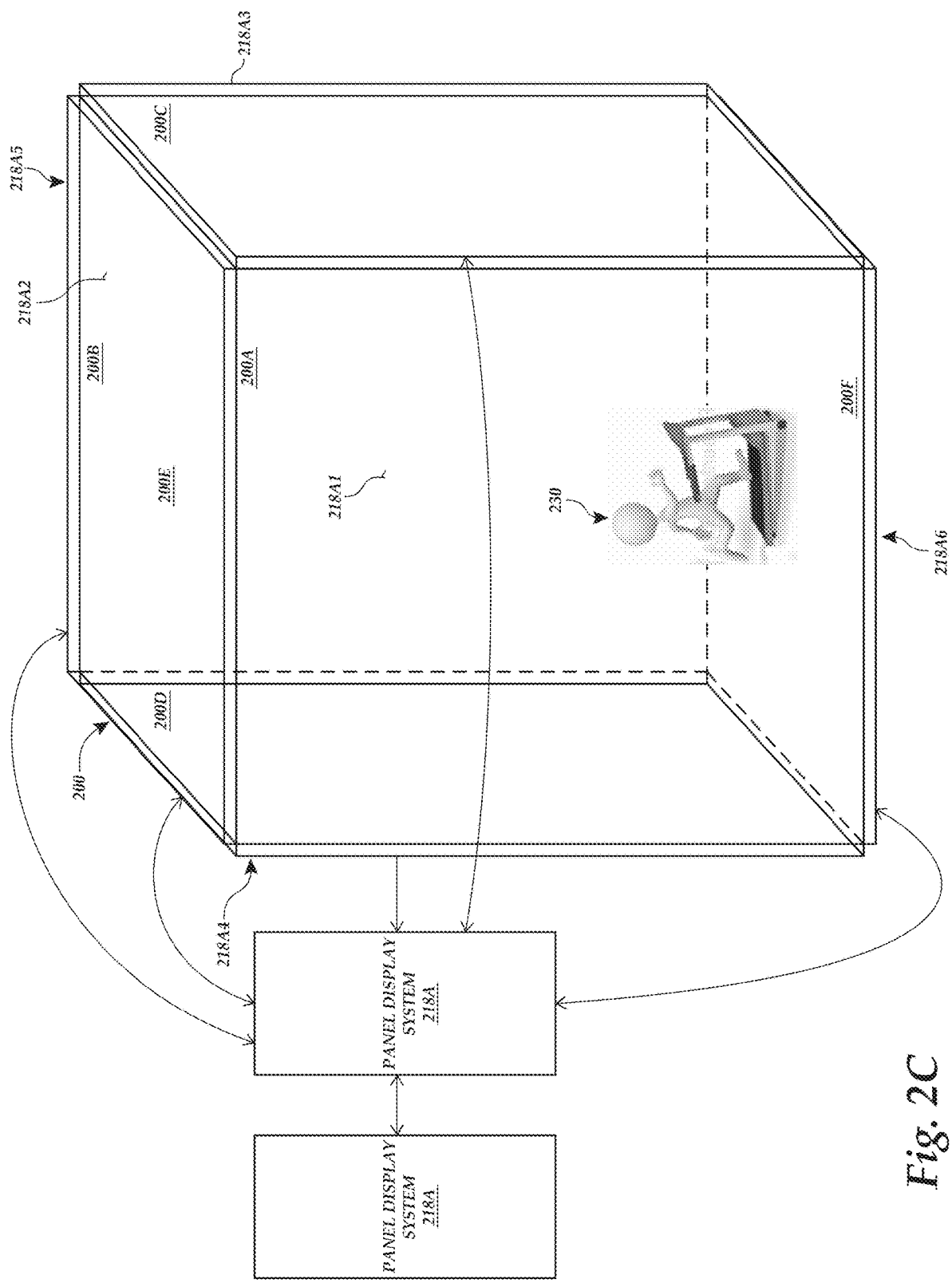
FIG. 2C is an embodiment of a panel display system that can be incorporated into the studio of FIG. 2A.

With reference to FIG. 2C, the video output subsystem 218A can be in the form of a panel display system. For example, the walls 200A-200F of the personal studio enclosure 200 could be formed from a protective layer, such as polycarbonate or clear, nonglare polycarbonate. Outside of these walls, display units such as in the form of LCD or LED full color displays can be disposed, facing inwardly into the interior of the personal studio enclosure 200. For example, the panel display system can include panel display units 218A1, 218A2, 218A3, 218A4, 218A5, and 218A6. In some embodiments, the panel display units 218A1-218A6 have sufficient resolution to generate life-size life-like images for the user 230. For example, the panel display unit 218A1-218A6 can have sufficient resolution and color quality such that the user 230 can approach and stand next to anyone of the panel display units wherein the imagery would appear to be life-sized and smooth, sharp imagery, such as that similar to real life. However, in some configurations, the number of total pixels that would need to be displayed would be too burdensome on the system, and thus slightly less than real-life resolution can be satisfactory.

With reference to FIG. 2C, in some embodiments, the display units 218A1-218A6 can be in the form of holographic displays such as those currently commercially available from Red Digital on the Hydrogen phone and/or using technology from Leia Inc.

The studio controller 204 can instruct the panel display system 218A to provide video imagery surrounding the user 230 so as to simulate the appearance of a desired environment for the user 230, for example, for using the user device 108. In the context of the user device 108 being a treadmill, the studio controller 204 could instruct the panel display system 218A to display a moving video of an approaching roadway on the front wall 200C with the display unit 218A3. The panel display system 218A can also display a roadway moving beneath the user 230 on the display device 218A6, which would create an image appearing to be a roadway upon which the user is running. Similarly, the panel display system 218A could display the appearance of a roadway retreating on the rear wall 200D with the rear display unit 218A4. Along those lines, the display system 218A could display scenery moving past the user 230 on side walls 200A, 200B with the display units 218A1 and 218A2. The display system 218A could cause the display unit 218A5 above the ceiling 218e to display the appearance of a sky with clouds gently moving and/or the sun.

The movement speed of the imagery displayed by the display units 218A1-218A6 can be adjusted so as to correspond to the speed of the treadmill upon which the user 230 is running. As described above, the treadmill 108 can be connected to the studio controller 204 and thus the speed of the treadmill 108 can be received by the studio controller 204. Thus, the studio controller 204 can instruct the panel display system 218A to display the images described above, moving at a speed corresponding to or approximately corresponding to the speed of the treadmill 108. Other techniques can also be used.

Figure 2D:
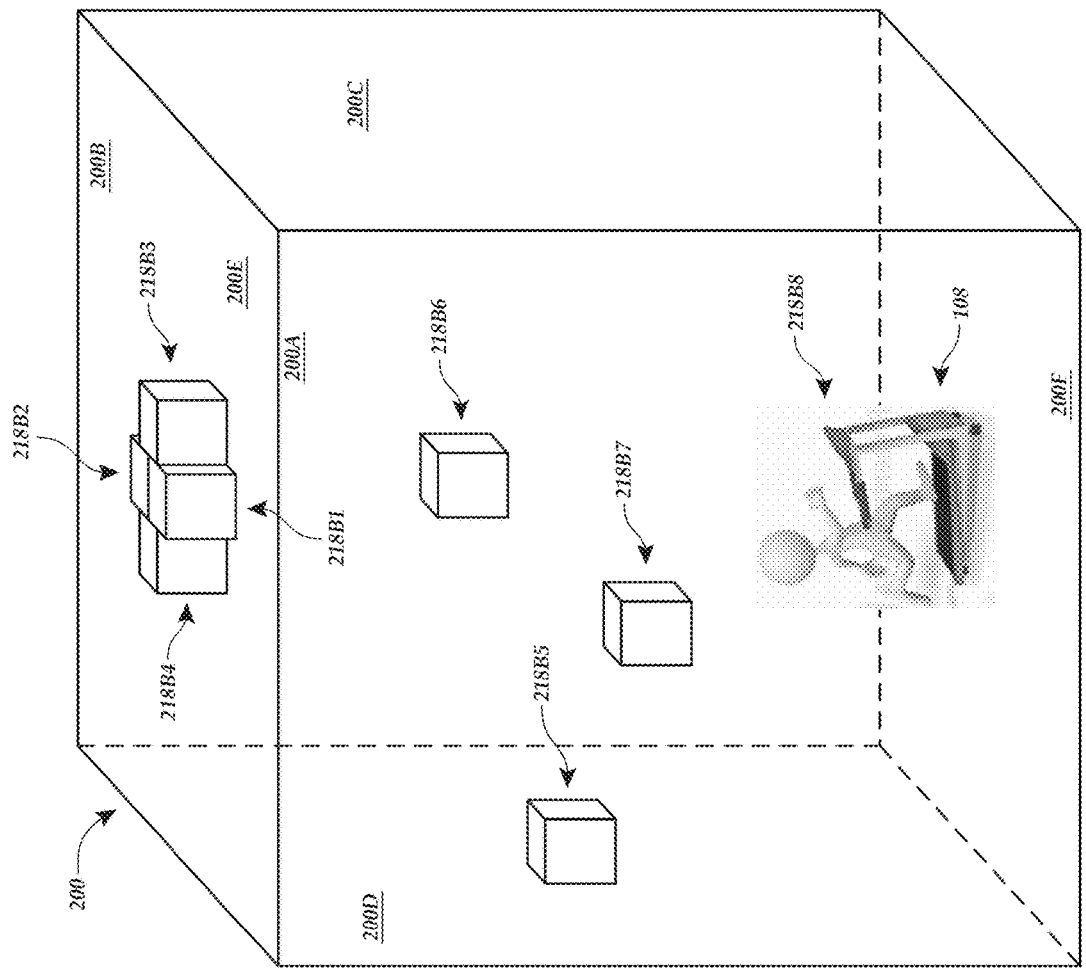
FIG. 2D is a schematic diagram of a front projection display system that can be incorporated into the studio of FIG. 2A.
Figure 2D:
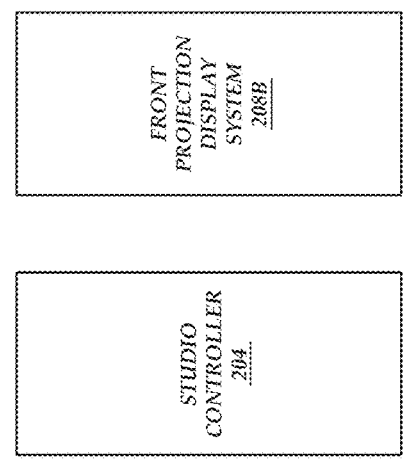

With reference to FIG. 2D, a further variation of the system 218 is illustrated therein, and identified generally by the reference numeral 218B. In this embodiment, the video out subsystem 218 is in the form of a front projection display system 218B. In such an embodiment, the personal studio enclosure 200 could have walls made out of an opaque material, such as white fiberglass or polycarbonate, and in some embodiments, a first layer of clear polycarbonate with additional layer of opaque white polycarbonate or white paint, or other surfaces appropriate for projection.

With continued reference to FIG. 2D, the front protection display system can include a plurality of projectors for projecting imagery on each of the walls 200A-200E of the personal studio enclosure 200. For example, the display system 218B can include a first projector 218B1 configured and oriented to project an image onto wall 200A, a projector 218B2 configured and oriented to project imagery onto the wall 200B, a projector 218B3 configured and oriented to project imagery onto the wall 200C, a projector 218B4 configured and oriented to project imagery onto the wall 200D, and a projector 218B5 configured and oriented to project imagery onto the ceiling 200E. Additionally, so as to provide more consistent coverage of the imagery on the floor 200F, the display system 218B can include two projectors 218B6 and 218B7 mounted to the right and left walls 200A, 200B, respectively, configured and oriented to project imagery onto the floor 200F. Optionally, in some embodiments, additional projectors can be included depending on the configuration of the user device 108. For example, the treadmill 108 can include an additional projector 218B8 configured and oriented to project imagery onto the surface of the treadmill such that a user 108 could perceive moving imagery on the treadmill itself and synchronized with the other imagery displayed on the floor 200F. Additional projectors can also be used.

Figure 2E:
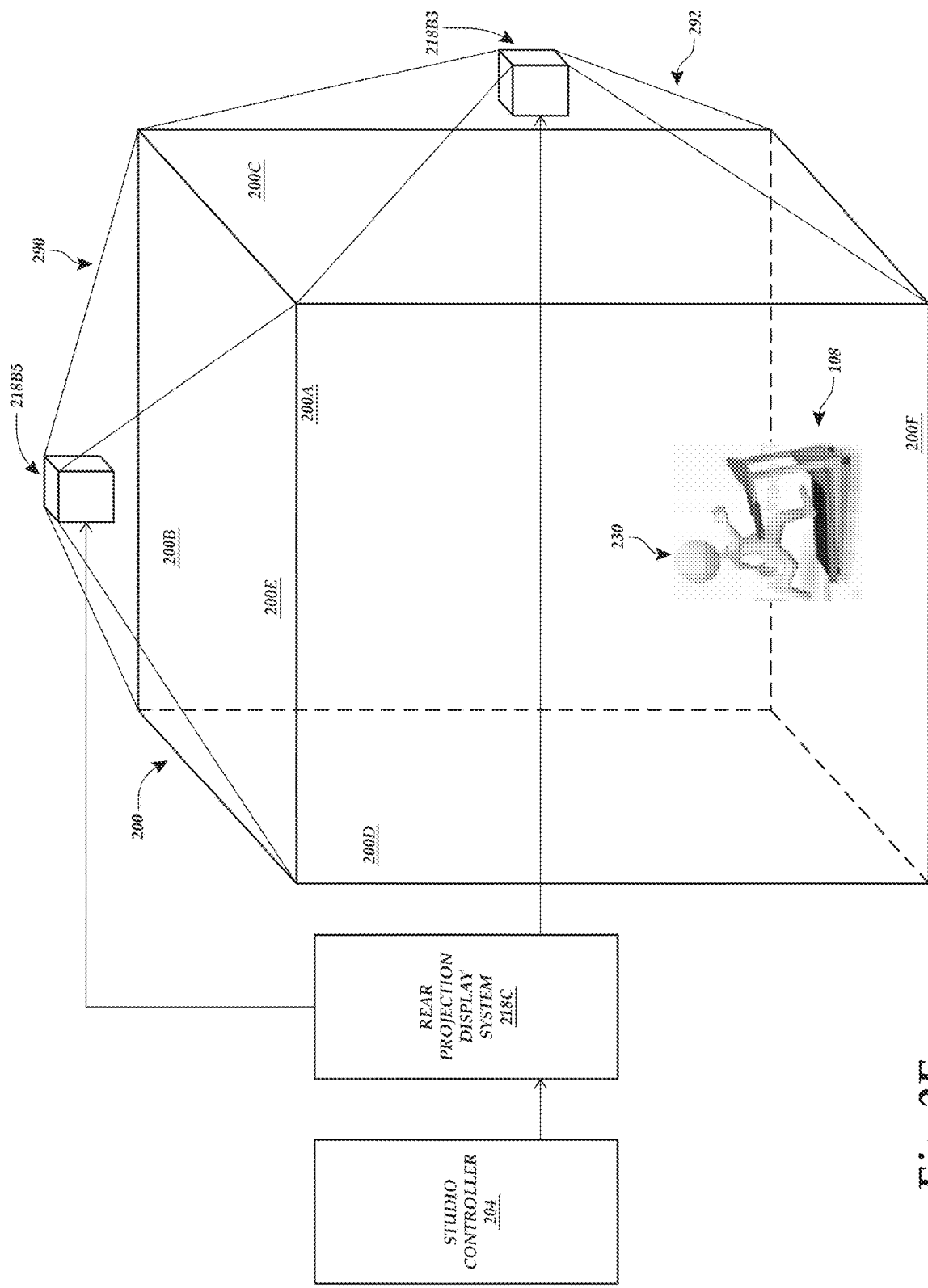
FIG. 2E is a schematic diagram of a rear projection display system that can be incorporated into the studio of FIG. 2A.

FIG. 2E illustrates another variation of the display system 218 identified generally by the reference numeral 218C. In this configuration, the display system 218 is in the form of a rear projection display system 218C. Thus, in this configuration, the walls 200A-200E of the personal studio enclosure 200 can be configured for rear projection. For example, the walls can be in the form of rigid structures made from translucent material. For example, in some embodiments, the walls 200A-200F can be in the form of thin fiberglass or polycarbonate translucent in color, such as a white translucent color. In some embodiments, the walls 200A-200F are made from thicker polycarbonate sufficiently strong to form the floors and walls of the room with a layer of translucent material or of translucent polycarbonate optimized for rear projection purposes. Thus, in this configuration, the personal studio enclosure 200 would include additional exterior structures for supporting and shading externally mounted projectors.

For example, as shown in FIG. 2E, the projector 218B5 can be mounted above the ceiling 200E with a shaded support structure 290 which is configured to support and shade the projector 218B5 so as to project imagery onto the rear of the ceiling 200E to thereby provide a visual experience of imagery to the user 230 inside the personal studio enclosure 200. Similarly, the projector 218B3 can be supported and shaded by a front support structure 292 to support the projector 218B3 in an orientation such that it can protect imagery onto the rear surface of the front wall 200C. The other projectors 218B can be supported and operated in a similar manner.

With continued reference to FIGS. 3A-3G as noted above, the user device 108 can be any one of many different devices for use in different kinds of activities. For example, with reference to FIG. 3A, the user device 108 can be in the form of a basketball 300. Thus, the studio control system 202 can be configured to image the user 230 and the basketball 300 during use. Similarly, the studio control system 202 can display imagery on the walls of the enclosure 200 that would be consistent with a basketball game, provide an aroma consistent with a basketball game, provide user lighting consistent with a basketball game, and provide audio consistent with a basketball game, as well as temperature and wind speed and humidity. Individually, the user interaction with the athletic activity (e.g., basketball) can be controlled in accordance with the learning topic categories or developmental phases that allows the user to develop skills related to the athletic activity. For example, first time users have a first set of activities, transformations related to captured user interaction and outputs. More experienced users associated with as second level may have different transformations and outputs or may be monitored for different types of user interaction. Such interactions are also applicable with the activities described in FIGS. 3B-3F.

Figure 3A:
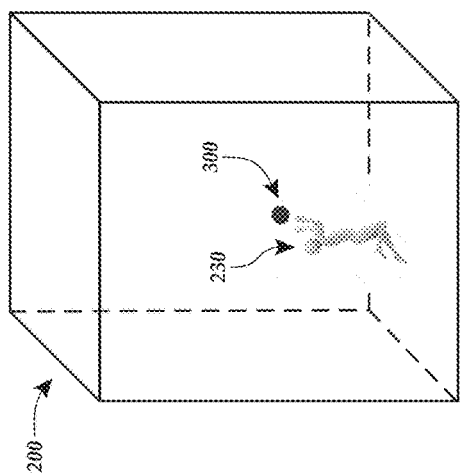
FIG. 3A is a schematic diagram of an embodiment of the studio of FIG. 2A used in a basketball training application.
Figure 3D:
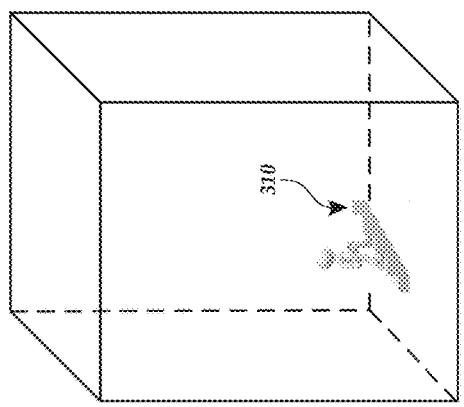
FIG. 3D is a schematic diagram of a studio of FIG. 2A used for a climbing application.
Figure 3B:
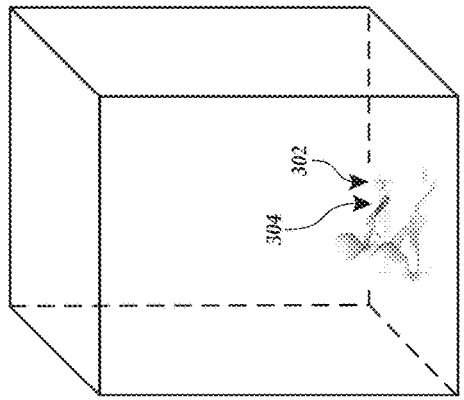
FIG. 3B is a schematic diagram of a studio of FIG. 2A used for a baseball batting training application.

Similarly, with reference to FIG. 3B, the user device can be in the form of a baseball 302 and a baseball bat 304. In this context, the studio control system 202 can be configured to provide audio, imaging, video display, user device inputs and outputs, aroma, user lighting, and environment temperature wind and humidity consistent with a baseball game.

Figure 3E:
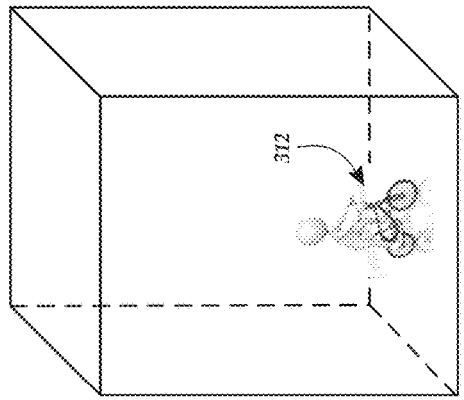
FIG. 3E is a schematic diagram of a studio of FIG. 2A used in a cycling application.
Figure 3C:
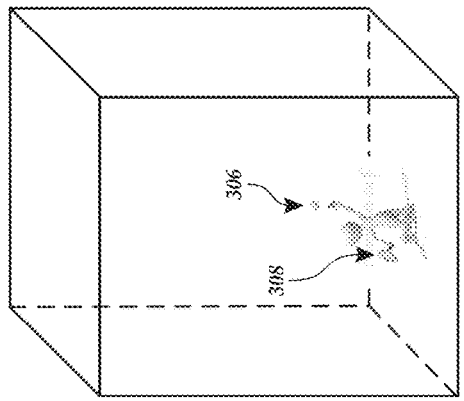
FIG. 3C is a schematic diagram of a studio of FIG. 2A used for a tennis application.

With reference to FIG. 3C, a user device can be in the form of a tennis ball 306 and a tennis racket 308. Thus, in this context, the studio control system 202 can provide audio, video, imaging, user device inputs and outputs, aroma, user lighting, and environmental temperature, wind, and humidity consistent with a tennis match.

With reference to FIG. 3D, a user device can be in the form of a stairclimbing exercise device 310. Thus, in this context, the studio control system 202 can be configured to provide audio, video display, user imaging, user device inputs and outputs, aroma, user lighting, and environmental temperature, wind speed, and humidity consistent with a climbing activity.

With reference to FIG. 3E, a user device can be in the form of a stationary or freely moving bicycle 312. As such, in this context, the studio control system 202 can be configured to provide audio, video display, user imaging, user device inputs and outputs, aroma, user lighting, and environmental temperature, wind speed, and humidity consistent with a bicycle riding experience.

Figure 3F:
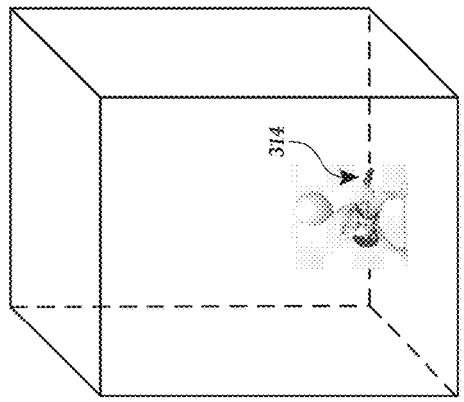
FIG. 3F is a schematic diagram of a studio of FIG. 2A used with a musical instrument application.

With reference to FIG. 3F, the user device can be in the form of a musical instrument such as a guitar 314. As such, in this context, the studio control system 202 can be configured to provide audio, video display, user imaging, user device inputs and outputs, aroma, user lighting, and environmental temperature, wind speed, and humidity consistent with a guitar performance.

With reference to FIG. 3G, a user device can be in the form of a kitchen appliance, such as an oven 316, in which the user 230 can eat as part of the captured interaction. As such, in this context, the studio control system 202 can be configured to provide audio, video display, user imaging, user device inputs and outputs, aroma, user lighting, and environmental temperature, wind speed, and humidity consistent with use of the kitchen appliance. Although cooking may not necessarily be traditionally considered an athletic activity, the user interaction with the activity (e.g., cooking) can be controlled in accordance with the learning topic categories or developmental phases that allows the user to develop skills related to the activity. For example, first time users have a first set of activities, transformations related to captured user interaction and outputs. More experienced users associated with as second level may have different transformations and outputs or may be monitored for different types of user interaction.

Figure 4A:
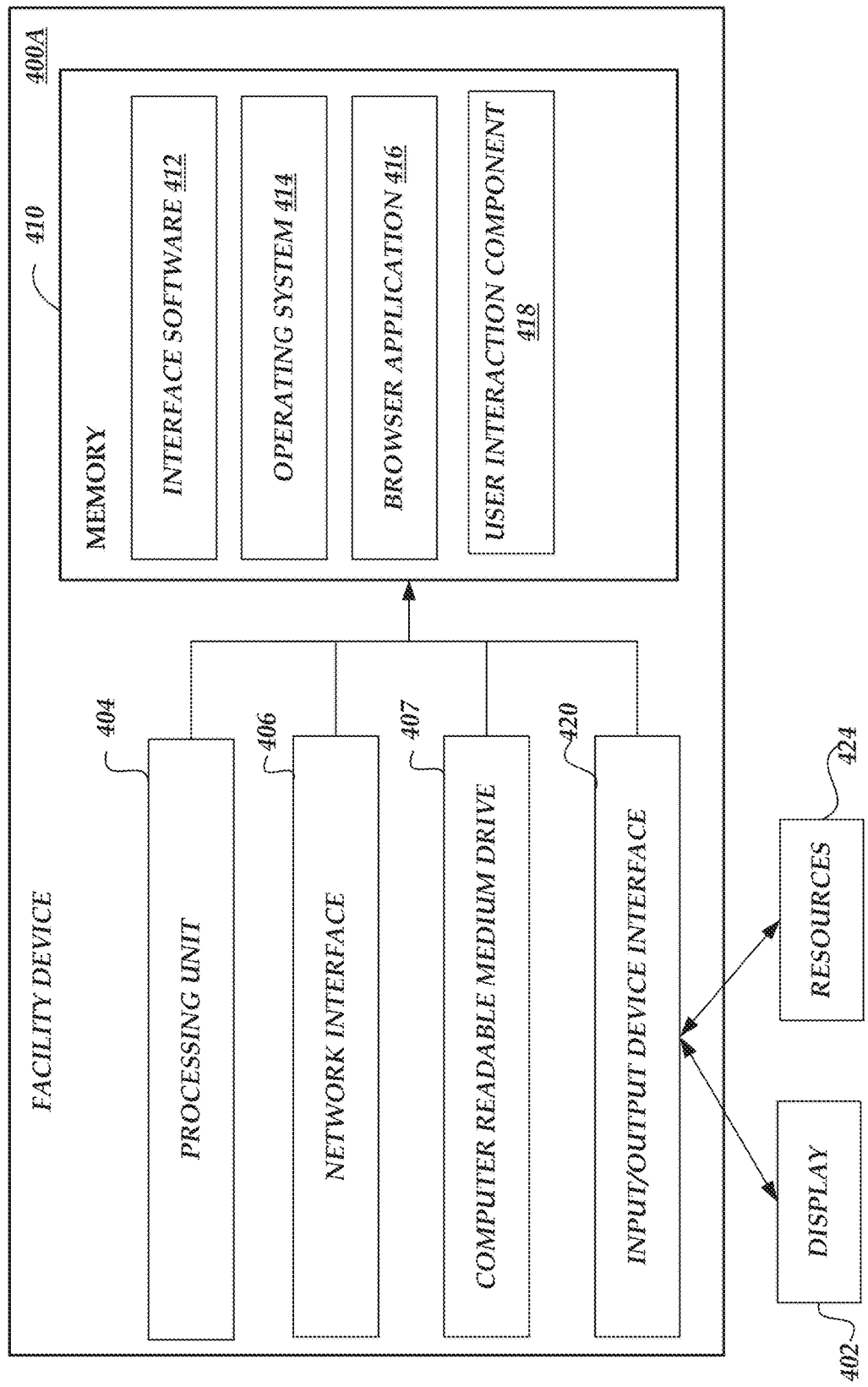
FIGS. 4A and 4B are block diagrams of illustrative components of a limited resource client computing device configured to remotely process content in accordance with an illustrative embodiment.

FIG. 4A depicts one embodiment of an architecture of an illustrative computing device 400A (facility device) that can generate and process interaction information in a physical facility 102 in accordance with the present application. Illustratively, the computing device 400A can include different types of devices for capturing or generating data, such as video cameras, microphones, sensors, and the like (as described herein). The general architecture of the computing device 400A depicted in FIG. 4A includes an arrangement of computer hardware and software components that may be used to implement aspects of the present disclosure. As illustrated, the computing device 400A includes a processing unit 404, a network interface 406, a computer readable medium drive 407, an input/output device interface 420, an optional display 402, and an input device 424, all of which may communicate with one another by way of a communication bus. Illustratively, the computing device 400A may have more limited functionality and components, such as inputs or outputs, as embedded devices.

The network interface 406 may provide connectivity to one or more networks or computing systems, such as the network 125 of FIG. 1. The processing unit 404 may thus receive information and instructions from other computing systems or services via a network. The processing unit 404 may also communicate to and from memory 410 and further provide output information for an optional display 402 via the input/output device interface 420. The input/output device interface 420 may also accept input from the optional input device 424, such as a keyboard, mouse, digital pen, etc. In some embodiments, the client 102 may include more (or fewer) components than those shown in FIG. 4A. For example, some embodiments of the computing device 400A may omit the display 402 and input device 424, while providing input/output capabilities through one or more alternative communication channel (e.g., via the network interface 406). Additionally, the computing device 400A may omit the input and output interface 420 altogether as well.

The memory 410 may include computer program instructions that the processing unit 404 executes in order to implement one or more embodiments. The memory 410 generally includes RAM, ROM, or other persistent or non-transitory memory. The memory 410 may store an operating system 414 that provides computer program instructions for use by the processing unit 404 in the general administration and operation of the computing device 400A. The memory 410 may further include computer program instructions and other information for implementing aspects of the present disclosure. For example, in one embodiment, the memory 410 includes a browser application 216 for accessing content. Illustratively, the browser application 416 may encompass a full software browser application, portions of a browser application or simply be a software application (or executable instructions) that provide for data connectivity. The memory 410 may further include a user interaction component 218 for capturing information related to user interact at a physical facility 102.

Figure 4B:
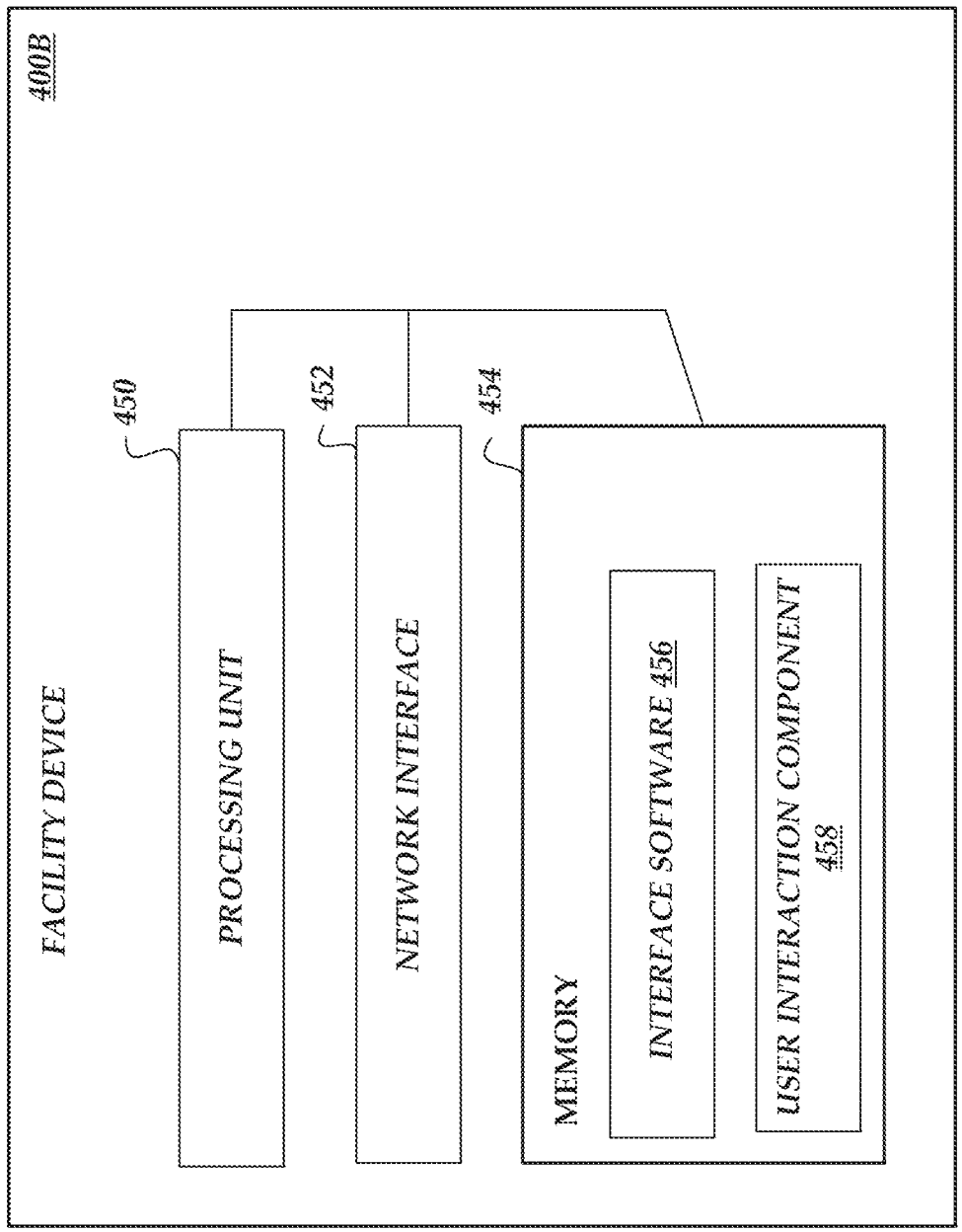

FIG. 4B depicts one embodiment of an alternative architecture of an illustrative client computing device 400B that can generate and process user interaction information or be utilized in conjunction with the generation and processing of user interaction information in accordance with the present application. Illustratively, the computing device 400B can include different types of devices for capturing or generating data, such as video cameras, microphones, sensors, and the like (as described herein). The alternative architecture of the client computing device 400B can also be utilized to provide instrumentation or user interaction capture functionality to devices. For example, the client computing device 400B may be incorporated or integrated into musical instruments, athletic equipment, clothing, etc. for purposes of capturing user interaction information. The general architecture of the computing device 400B depicted in FIG. 4B includes an arrangement of computer hardware and software components that may be used to implement aspects of the present disclosure. However, computing device 400B may be associated with a reduced of components that may limit the computing functionality and operation of the computing device 400A. As illustrated, the computing device 400B includes a processing unit 450 and a network interface 452 that communicate with a communication bus. Unlike computing device 400A (FIG. 4A), the computing device 400B may not have a computer readable medium drive, an input/output device interface, an optional display, or an input device.

The network interface 452 may provide connectivity to one or more networks or computing systems, such as the network 125 of FIG. 1. The processing unit 450 may thus receive information and instructions from other computing systems or services via a network. The memory 454 may include computer program instructions that the processing unit 250 executes in order to implement one or more embodiments. The memory 454 generally includes RAM, ROM, or other persistent or non-transitory memory. In this embodiment, the memory 454 may store necessarily store a full operating system that provides computer program instructions for use by the processing unit 450 in the general administration and operation of the client 102A. Rather, in one embodiment, the memory 454 includes an interface software component 456 for accessing receiving and processing instructions and user interaction processing component 458 for capturing information related to user interact at a physical facility 102.

Figure 5:
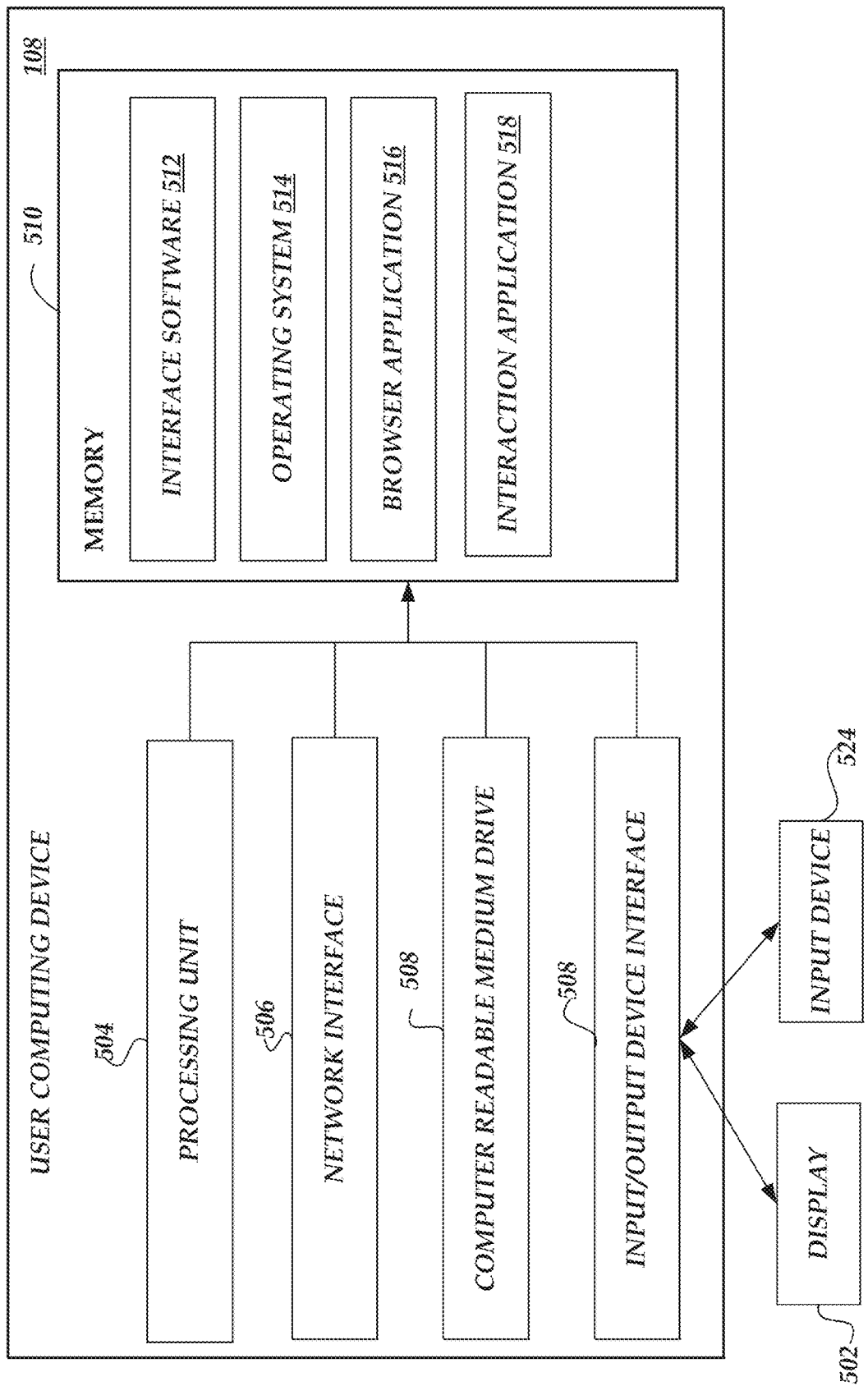
FIG. 5 is a block diagram of illustrative components of a user computing device configured to remotely process content in accordance with an illustrative embodiment.

FIG. 5 depicts one embodiment of an architecture of an illustrative user computing device 108 that can generate and process user interaction information or provide additional information in accordance with processed user interaction information in accordance with various aspects of the present application. The general architecture of the user computing device 108 depicted in FIG. 5 includes an arrangement of computer hardware and software components that may be used to implement aspects of the present disclosure. As illustrated, the user computing device 108 includes a processing unit 504, a network interface 506, a computer readable medium drive 507, an input/output device interface 550, an optional display 502, and an input device 524, all of which may communicate with one another by way of a communication bus.

The network interface 506 may provide connectivity to one or more networks or computing systems, such as the network 125 of FIG. 1. The processing unit 504 may thus receive information and instructions from other computing systems or services via a network. The processing unit 504 may also communicate to and from memory 510 and further provide output information for an optional display 502 via the input/output device interface 550. The input/output device interface 550 may also accept input from the optional input device 524, such as a keyboard, mouse, digital pen, etc. In some embodiments, the user computing device 108 may include more (or fewer) components than those shown in FIG. 5.

The memory 510 may include computer program instructions that the processing unit 504 executes in order to implement one or more embodiments. The memory 510 generally includes RAM, ROM, or other persistent or non-transitory memory. The memory 510 may store an operating system 514 that provides computer program instructions for use by the processing unit 504 in the general administration and operation of the user computing device 108. The memory 510 may further include computer program instructions and other information for implementing aspects of the present disclosure. For example, in one embodiment, the memory 510 includes a browser application 516 for accessing content and communicating with and processing information with the physical facility 102 or network-based services 110.

Figure 6:
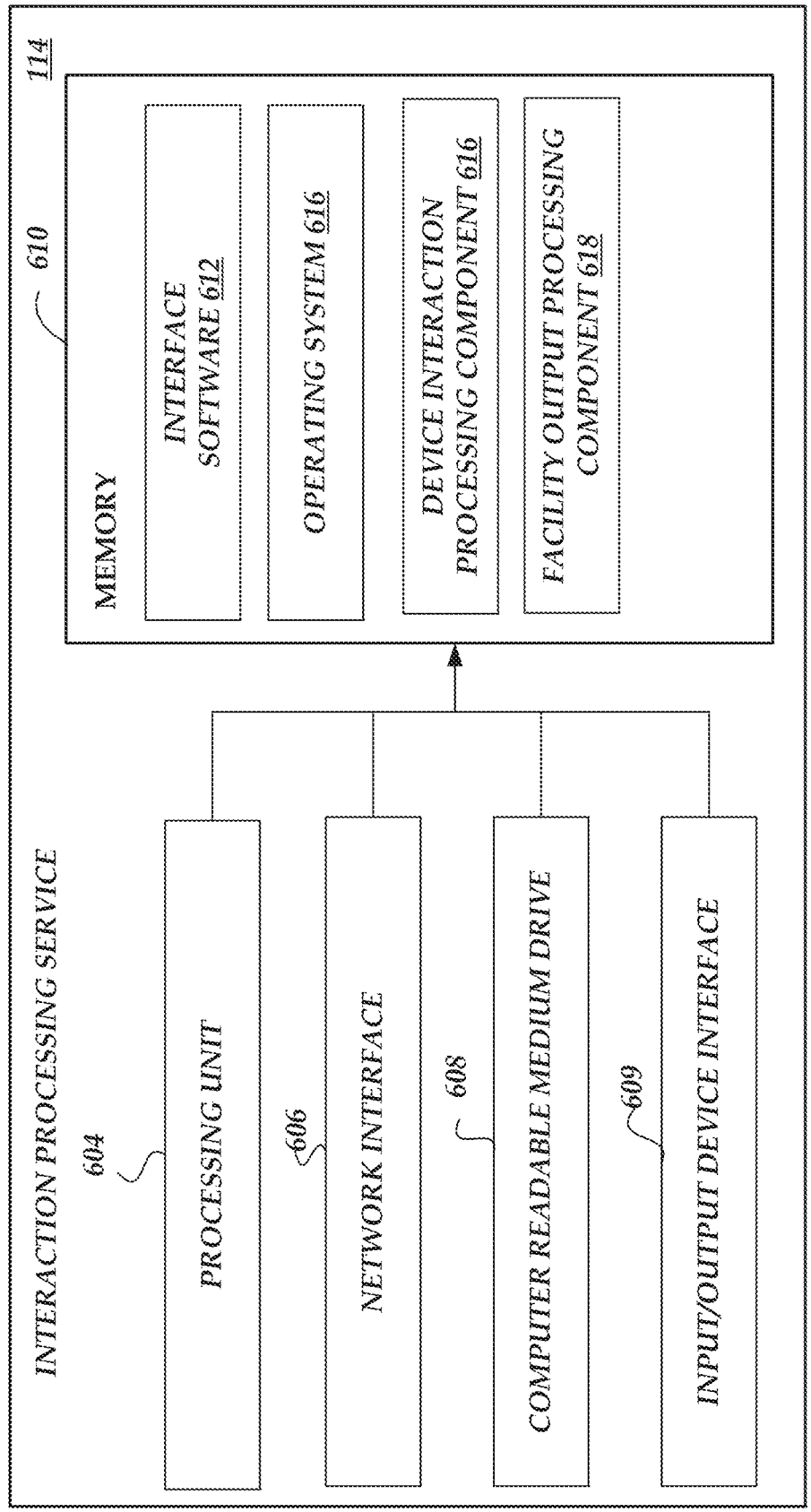
FIG. 6 is a block diagram of illustrative components of an interaction processing service computing device configured to process or configure user interaction in facilities in accordance with an illustrative embodiment.

FIG. 6 depicts one embodiment of an architecture of an illustrative server for implementing the interaction processing services 114 component described herein. The general architecture of the interaction processing services 114 depicted in FIG. 6 includes an arrangement of computer hardware and software components that may be used to implement aspects of the present disclosure. As illustrated, the messaging services 114 includes a processing unit 604, a network interface 606, a computer readable medium drive 608, an input/output device interface 609, an optional display, and an input device, all of which may communicate with one another by way of a communication bus. The components of the messaging services 114 may be physical hardware components or implemented in a virtualized environment.

The network interface 606 may provide connectivity to one or more networks or computing systems, such as the network 125 of FIG. 1. The processing unit 604 may thus receive information and instructions from other computing systems or services via a network. The processing unit 604 may also communicate to and from memory 610 and further provide output information for an optional display via the input/output device interface 609. The input/output device interface 609 may also accept input from the optional input device, such as a keyboard, mouse, digital pen, etc. In some embodiments, the messaging services 114 may include more (or fewer) components than those shown in FIG. 6.

The memory 610 may include computer program instructions that the processing unit 604 executes in order to implement one or more embodiments. The memory 610 generally includes RAM, ROM, or other persistent or non-transitory memory. The memory 610 may store an operating system 614 that provides computer program instructions for use by the processing unit 604 in the general administration and operation of the messaging services 114. The memory 610 may further include computer program instructions and other information for implementing aspects of the present disclosure. For example, in one embodiment, the memory 610 includes client interface software 612 for receiving user interaction data or other data. Additionally, the memory 610 includes a device interaction processing component 616 for processing user interaction data, at least in part, based on the configuration information. The memory 610 includes a facility output processing component 618 for processing physical facility outputs as described herein.

Figure 7:
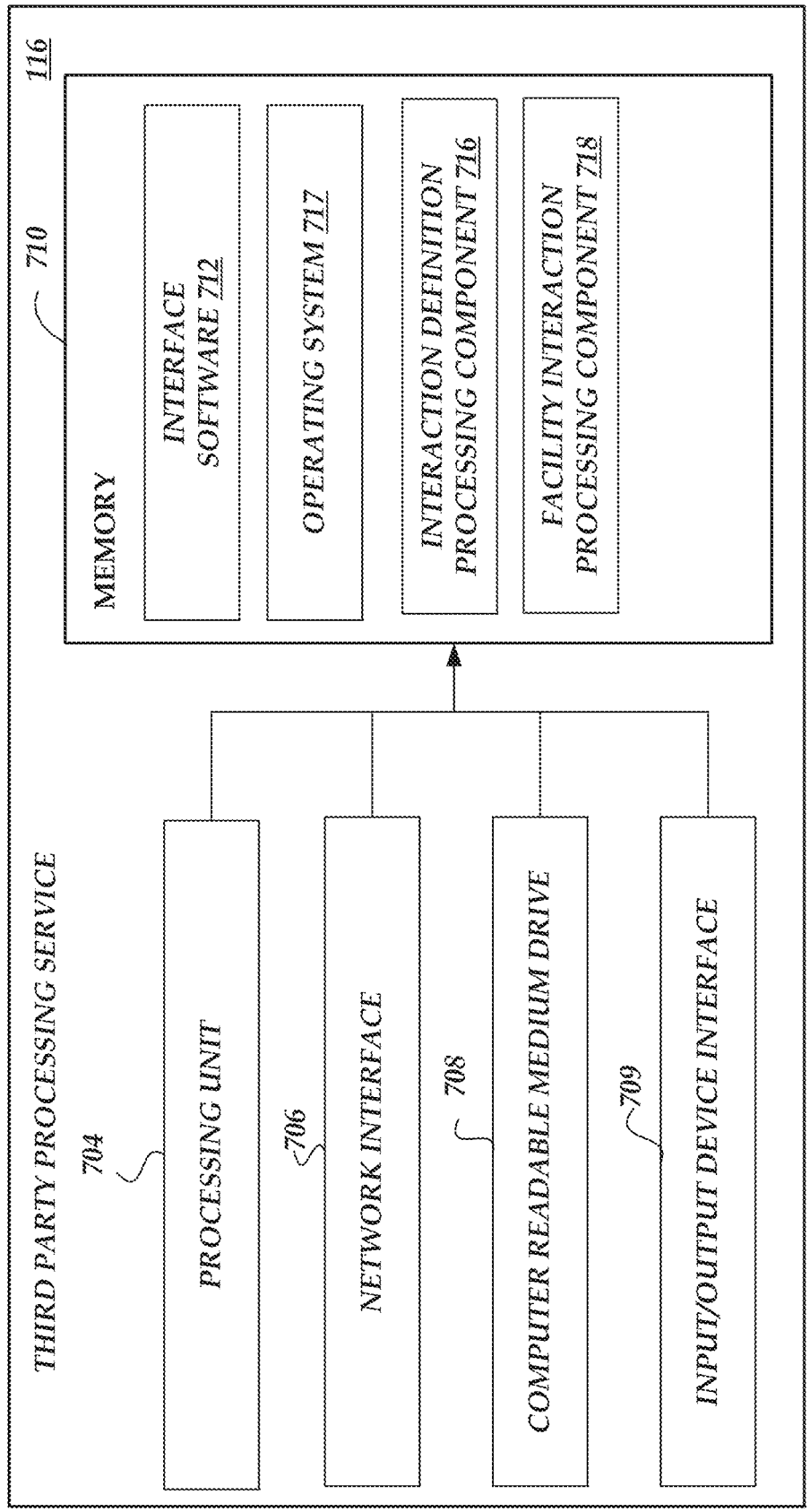
FIG. 7 is a block diagram of illustrative components of a third party processing service computing device configured to process or configure third party definitions for user interaction in facilities in accordance with an illustrative embodiment.

FIG. 7 depicts one embodiment of an architecture of an illustrative server for implementing the third party processing services 116 component described herein. The general architecture of the third party processing services 116 depicted in FIG. 7 includes an arrangement of computer hardware and software components that may be used to implement aspects of the present disclosure. As illustrated, the third party processing services 116 includes a processing unit 704, a network interface 706, a computer readable medium drive 708, an input/output device interface 709, an optional display, and an input device, all of which may communicate with one another by way of a communication bus. The components of the third party processing services 116 may be physical hardware components or implemented in a virtualized environment.

The network interface 706 may provide connectivity to one or more networks or computing systems, such as the network 125 of FIG. 1. The processing unit 704 may thus receive information and instructions from other computing systems or services via a network. The processing unit 704 may also communicate to and from memory 710 and further provide output information for an optional display via the input/output device interface 709. The input/output device interface 709 may also accept input from the optional input device, such as a keyboard, mouse, digital pen, etc. In some embodiments, the third party processing services 116 may include more (or fewer) components than those shown in FIG. 7.

The memory 710 may include computer program instructions that the processing unit 704 executes in order to implement one or more embodiments. The memory 710 generally includes RAM, ROM, or other persistent or non-transitory memory. The memory 710 may store an operating system 714 that provides computer program instructions for use by the processing unit 704 in the general administration and operation of the third party processing services 116. The memory 710 may further include computer program instructions and other information for implementing aspects of the present disclosure. For example, in one embodiment, the memory 710 includes interface software 712 for receiving and processing configuration requests or updates from third-party customer networks 130. Additionally, the memory 710 includes an interaction definition component 716 for processing the configuration or definition of the user interactions, including the specification of multiple phases of interaction as described herein. The memory 710 also includes a facility interaction processing component 718 for generating information utilized by the studio controller 204 or other components to facilitate the collection and processing of user interaction information.

Figure 8:
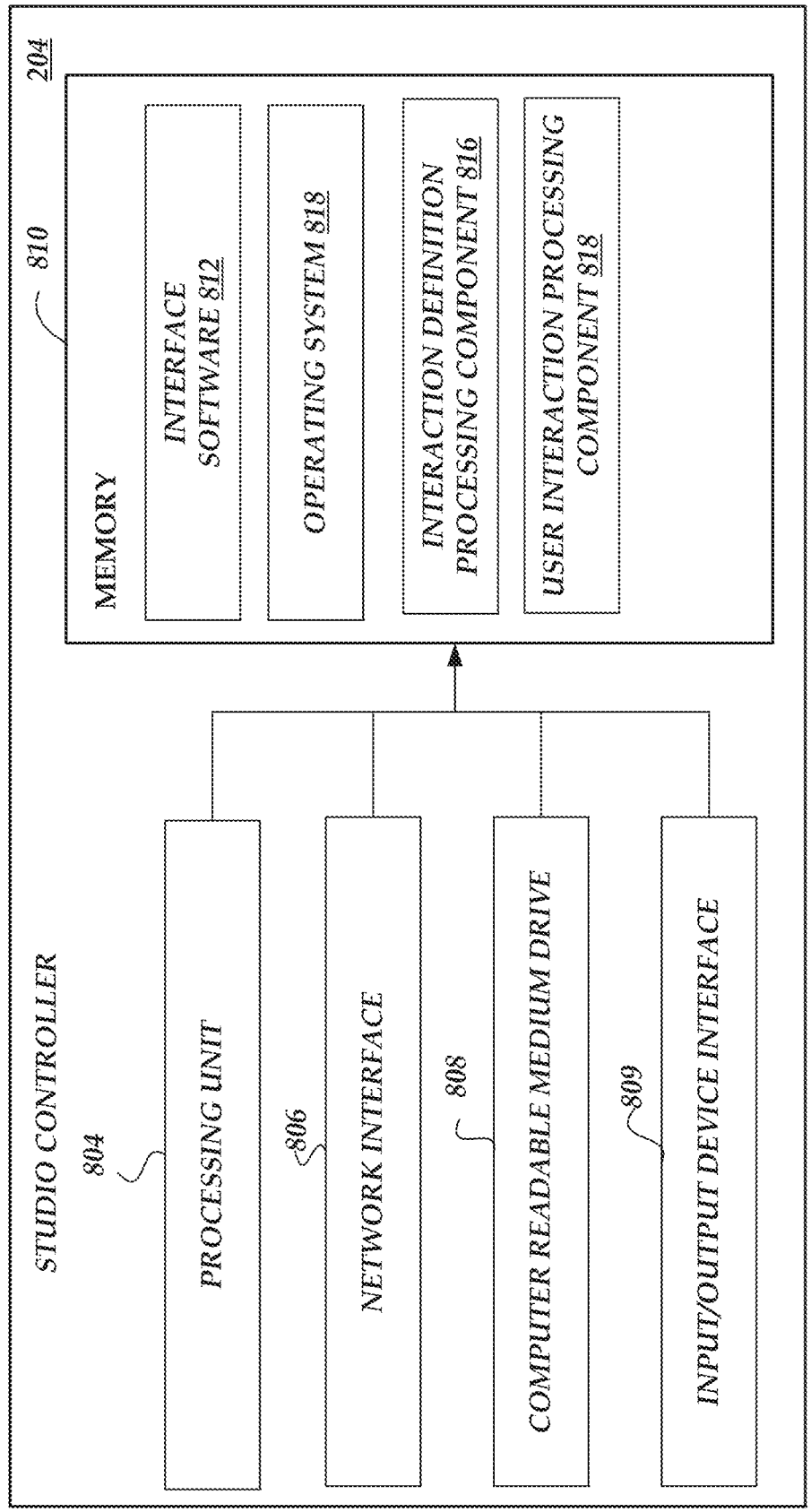
FIG. 8 is a block diagram of illustrative components of a studio controller computing device configured to process or configure user interaction in facilities in accordance with an illustrative embodiment.

FIG. 8 depicts one embodiment of an architecture of an illustrative server for implementing the studio controller component 204 described herein. The general architecture of the studio controller component 204 depicted in FIG. 8 includes an arrangement of computer hardware and software components that may be used to implement aspects of the present disclosure. As illustrated, the studio controller component 204 includes a processing unit 804, a network interface 808, a computer readable medium drive 808, an input/output device interface 809, an optional display, and an input device, all of which may communicate with one another by way of a communication bus. The components of the studio controller component 204 may be physical hardware components or implemented in a virtualized environment.

The network interface 809 may provide connectivity to one or more networks or computing systems, such as the network 125 of FIG. 1. The processing unit 804 may thus receive information and instructions from other computing systems or services via a network. The processing unit 804 may also communicate to and from memory 810 and further provide output information for an optional display via the input/output device interface 809. The input/output device interface 809 may also accept input from the optional input device, such as a keyboard, mouse, digital pen, etc. In some embodiments, the messaging services 114 may include more (or fewer) components than those shown in FIG. 8.

The memory 810 may include computer program instructions that the processing unit 804 executes in order to implement one or more embodiments. The memory 810 generally includes RAM, ROM, or other persistent or non-transitory memory. The memory 810 may store an operating system 814 that provides computer program instructions for use by the processing unit 804 in the general administration and operation of the studio controller component 204. The memory 810 may further include computer program instructions and other information for implementing aspects of the present disclosure. For example, in one embodiment, the memory 810 includes client interface software 812 for receiving user interaction data or other data. The memory 810 can include a configuration component 816 for obtaining configuration information for processing user interaction information and for transmitting processing captured user interaction information to an external source, such as a third party. Additionally, the memory 810 includes a device interaction processing component 818 for processing user interaction data, at least in part, based on the configuration information. The memory 810 includes a facility output processing component 820 for processing physical facility outputs as described herein. The studio controller component 204 can function independently to collect and process interaction information or in conjunction with the interaction processing services 114 of the network-based services 110.

Turning now to FIG. 9, an illustrative description of the configuration of the inputs, processing and outputs related to user interaction can further be defined or organized according to a set of developmental phases will be described. As described above, individual phases of a set of phases can specify the set of inputs, processing and outputs, which may vary at least in part between phases. Additionally, the developmental phases can be considered to be sequential in nature in which a predecessor phase can include outputs to elicit additional interaction to facilitate transition to a subsequent phase or criteria that can determine when progress to a subsequent phase is acceptable.

As illustrated in FIG. 9, in one embodiment, the development phases can be specified in one of four developmental phases. The set of phases can include a first phase 902 related to introduction and general learning of an identified concept. The first phase 902 can be defined in terms of inputs, processing and outputs that are associated or characterized as provided user interaction related to introduction of a concept and general learning/increased development. The set of phases can include a second phase 904 related to development/mastery of the identified concept. The second phase 904 can be defined in terms of inputs, processing and outputs that are associated or characterized as provided user interaction related to increased skill development of the identified concept. The set of inputs, processing and outputs may have some overlap with the set of inputs, processing and outputs associated with the first phase 902.

The set of phases can include a third phase 906 related to content creation/composition and creative development of the identified concept. The third phase 906 can be defined in terms of inputs, processing and outputs that are associated or characterized as provided user interaction related to content creation or composition based on a development mastery of the concept. The set of phases can include a fourth phase 908 related to collaboration(s) with other users relating to the identified concept. The fourth phase 908 can be defined in terms of inputs, processing and outputs that are associated or characterized as provided user interaction related to share or combine skill sets with other users a physical facility or via a remote user device 108. The set of inputs, processing and outputs may have some overlap with the set of inputs, processing and outputs associated with the first phase 902, second phase 904 or third phase 906. Although embodiments are illustrated with regard to four developmental phrases, one or more interactions may omit a definition of a full set of user interaction developmental phases or the specification of user interactions according to phases.

For purposes of illustration, one or more interactions involving user interactions at a physical facility 102 will be described. However, additional, modified or alternative interactions may also be considered to be within the scope of one or more aspects of the present application. In a first example, the physical facility can be configured in accordance with augmented user interaction. Such configuration can include the input of user profile information, such as images, pictures or other personalization data. The inputted information can be processed to be integrated in a manner for presentation to the user in the physical facility as one or more outputs. For example, images or other personalization information can be integrated into the user's interaction at the physical facility to promote familiarity or elicit positive emotional responses. As described above, identified users at a physical location may be associated with a profile or have access to personal information that can be utilized by the studio controller for personalization of the user experience, generally referred to as personalization information. In some embodiments, the studio controller can receive image data, playlists, display preference data, language preference data, sensitivity information, and the like that can be utilize in various aspects as described herein. The personalization information may be provided by network-based services associated with the physical locations, one or more third-party services, or one or more user devices associated with the user (e.g., in physical proximity to the user). Still further, the unique personalization information provided (or otherwise obtained) can be utilized as part of the processing of the interaction data. In one embodiment, video data from a "favorites" can be integrated into captured video interaction data to generate a more unique output that can be delivered to the user or transmitted to other services. In another embodiment, images from the personalization information can be outputted in physical location or blended into the outputs provided at the physical location (e.g., one or more outer walls of the physical location displaying a "favorite location," "favorite setting," or favorite individuals). An introductory phase may limit the amount of personalization. The second phase or mastery phase may increase customization to encourage increased skill development. A third phase may encourage additional user interaction to facility customization or creation of additional interaction. Finally, a fourth phase may include the projection of the user interaction (customized) to other users or the incorporation of other user customizations into the user interaction. For example, someone having a social network relationship may be able to project customized content to a set of other users. In another example, users may be presented with images to encourage additional physical interaction (e.g., projecting images of a set of teammates to encourage individual user physical activity). In still a further example, results of the user interaction may be posted on various social media networks to elicit responses from other users of the social media network. In turn, the results of the elicited actions (e.g., "likes") can be utilized as inputs to the physical facility to reward the user, modify the user interaction or promote additional user interaction. Such rewards may be based on thresholds (e.g., 500 clicks result in an accrued reward).

In a second example, the physical facility can be configured in accordance with digital/physical transformation embodiment. Such configuration can include a translation of physical activities to network-based services, a network-based services to physical indicators or other outputs or a combination thereof. As described above, in one embodiment, various physical interactions can be gamified in a manner to provide a benefit in a digital game. Such gamification may be customizable by the third-party customer and dynamically adjustable. The inputted information can be processed to be integrated in a manner for capturing user interaction in the physical facility and including processing instructions to translate the physical activities as one or more outputs to network-based services 120, such as video games, social networks, etc. For example, attributes of physical interaction or emotional response can be customized to equate to activities or value in a network-based service (e.g., a video game, social network or other interactive service). An introductory phase may introduce the identification of the desired user interaction or the equivalency rules associated with the interaction. The second phase or mastery phase may increase customization to encourage increased skill development, such as the development of new skill sets for an avatar or the increased equivalency of user interaction (e.g., more advanced users can receive greater translation multipliers). A third phase may encourage additional user interaction to facility customization or creation of additional interaction. Finally, a fourth phase may include the projection of the user interaction (customized) to other users or the incorporation of other user customizations into the user interaction. For example, the studio controller component 204 can generate information for social networks to encourage additional interaction with the physical facility 102 or to encourage other users to interact. In another example, access to scheduling or other services can be facilitated or enabled through a measurement of interaction or a characterization of the interaction.

In still another example, the physical facility can be configured in accordance with an athletic embodiment. Such configuration can include a translation of physical activities to profiles or network-based services for promotion of physical activities. As described above, in one embodiment, various physical interactions can be gamified in a manner to provide a benefit in digital domain, such as levels of performance, avatars, etc. Such gamification may be customizable by the third-party customer and dynamically adjustable. The inputted information can be processed to be integrated in a manner for capturing user interaction in the physical facility and including processing instructions to translate the physical activities as one or more outputs to network-based services 120. For example, attributes of physical interaction or emotional response can be customized to equate to activities or value in a network-based service (e.g., a video game, social network or other interactive service). The user interaction information can be captured utilizing devices external to the user or integrated in devices (e.g., sporting equipment) utilized by the user. Still further, the user interaction information can be captured by specialized equipment worn by the user, such as heart rate monitors, tracking devices, etc.

In some embodiments, vital health information from a user profile may be incorporated into the control of devices (e.g., resistance levels) or instructions provided to the user, such as instructions for performing the athletic activity In other aspects, health information may also be incorporated as part of the configuration information, such as in the value of transformations associated with successful physical activity based on a perceived level of exertion.

An introductory phase may introduce the identification of the desired user interaction or the equivalency rules associated with the interaction. The second phase or mastery phase may increase customization to encourage increased skill development, such as the development of new skill sets for an avatar or the increased equivalency of user interaction (e.g., more advanced users can receive greater translation multipliers). A third phase may encourage additional user interaction to facility customization or creation of additional interaction. Finally, a fourth phase may include the projection of the user interaction (customized) to other users or the incorporation of other user customizations into the user interaction. For example, the studio controller component 204 can generate information for social networks to encourage additional interaction with the physical facility 102 or to encourage other users to interact. In another example, access to scheduling or other services can be facilitated or enabled through a measurement of interaction or a characterization of the interaction.

In still a further example, the physical facility can be configured in accordance with an rest or relaxation embodiment. Such configuration can include a translation of physical activities to profiles or network-based services for promotion of a training program in which a user follows a prescribed course of action. As described above, in one embodiment, various physical interactions can be gamified in a manner to provide a benefit in digital domain, such as levels of performance, avatars, etc. Such gamification may be customizable by the third-party customer and dynamically adjustable. The inputted information can be processed to be integrated in a manner for capturing user interaction in the physical facility and including processing instructions to translate the physical activities as one or more outputs to network-based services 120. For example, attributes of physical interaction or emotional response can be customized to equate to activities or value in a network-based service (e.g., a video game, social network or other interactive service). The user interaction information can be captured utilizing devices external to the user or integrated in devices (e.g., sporting equipment) utilized by the user. Still further, the user interaction information can be captured by specialized equipment worn by the user, such as heart rate monitors, tracking devices, etc.

In some embodiments, vital health information from a user profile may be incorporated into the control of devices (e.g., resistance levels) or instructions provided to the user, such as meditation or Yoga instructions. In other aspects, health information may also be incorporated as part of the configuration information, such as in the value of transformations associated with successful physical activity. For example, heart rate information may be indicative of a particular physical state of the user.

An introductory phase may introduce the identification of the desired user interaction or the equivalency rules associated with the interaction. The second phase or mastery phase may increase customization to encourage increased skill development, such as the development of new skill sets for an avatar or the increased equivalency of user interaction (e.g., more advanced users can receive greater translation multipliers). A third phase may encourage additional user interaction to facility customization or creation of additional interaction. Finally, a fourth phase may include the projection of the user interaction (customized) to other users or the incorporation of other user customizations into the user interaction. For example, the studio controller component 204 can generate information for social networks to encourage additional interaction with the physical facility 102 or to encourage other users to interact. In another example, access to scheduling or other services can be facilitated or enabled through a measurement of interaction or a characterization of the interaction.

All of the methods and processes described above may be embodied in, and fully automated via, software code modules executed by one or more computers or processors. The code modules may be stored in any type of non-transitory computer-readable medium or other computer storage device. Some or all of the methods may alternatively be embodied in specialized computer hardware.

Conditional language such as, among others, "can," "could," "might" or "may," unless specifically stated otherwise, are otherwise understood within the context as used in general to present that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as 'a' or 'an' should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Any routine descriptions, elements or blocks in the flow diagrams described herein and/or depicted in the attached figures should be understood as potentially representing modules, segments, or portions of code which include one or more executable instructions for implementing specific logical functions or elements in the routine. Alternate implementations are included within the scope of the embodiments described herein in which elements or functions may be deleted, or executed out of order from that shown or discussed, including substantially synchronously or in reverse order, depending on the functionality involved as would be understood by those skilled in the art.

The foregoing may be better understood in view of the following clauses:

Clause 1. A system for facilitating user interaction with devices, the system comprising:
- a plurality of facility interaction devices, wherein individual facility interaction devices are configured, at least in part, to capture user interaction with devices;
- a controller implemented on computing device having a processor and a memory, wherein the controller executes computer-readable instructions that allow the controller to implement:
  - an interface component for obtaining captured user interaction information from at least one of the plurality of facility interaction devices;
  - a configuration component for obtaining configuration information associating user interaction with identified devices;
  - a user interaction component for processing captured user interaction information according to configuration information to generate processed interaction information;
  - a facility interaction component for generating one or more physical outputs associated with the processed interaction information according to configuration information;
- wherein the user interaction component processes captured user interaction information associated with an identified device according to the configuration information corresponding to the identified device, the configuration information associating the captured user interaction information to at least one of a user profile or user account; and
- wherein the facility interaction component generates at least one output based on the processed captured user interaction information to elicit user interaction responsive to the captured user interaction with the identified device.

Clause 2. The system as recited Clause 1, wherein the configuration component is further operable to transmit the associated captured user interaction to an external source.

Clause 3. The system as recited in Clause 1, wherein the configuration information is associated with one or more learning categories and wherein individual learning categories define unique associations between captured user interaction information.

Clause 4. The system as recited in Clause 3, wherein the configuration information is associated with a set of learning categories corresponding to sequential learning.

Clause 5. The system as recited in Clause 1, wherein the one or more physical outputs correspond to at least one of a video output or an audio output.

Clause 6. A method for managing user interaction information, the method comprising:
- obtaining captured user interaction information from at least one of a plurality of identified interaction devices associated with a facility;
- processing the captured user interaction information according to configuration information to generate processed interaction information, the configuration information associating the captured user interaction information to at least one of a user profile or user account; and
- generating one or more physical outputs associated with the processed interaction information according to configuration information, the one or more physical outputs configured to elicit user interaction responsive to the captured user interaction with the identified device.

Clause 7. The method as recited in Clause 6 further comprising obtaining configuration information associating user interaction with identified devices from an external source.

Clause 8. The method as recited in Clause 6 further comprising transmitting the processed user interaction information to an external source.

Clause 9. The method as recited in Clause 6, wherein the configuration information is associated with one or more learning categories and wherein individual learning categories define unique associations between captured user interaction information.

Clause 10. The method as recited in Clause 9, wherein the individual learning categories include an exploration category, a growth category, a composition category, and a collaboration category.

Clause 11. The method as recited in Clause 6, wherein the one or more physical outputs correspond to at least one of a video output or an audio output.

Clause 12. The method as recited in Clause 11, wherein the one or more physical outputs include generating a color to elicit user interaction and indicative of the processed interaction information.

Clause 13. The method as recited in Clause 11, wherein the one or more physical outputs include video imagery data to elicit user interaction and indicative of the processed interaction information.

Clause 14. The method as recited in Clause 11, wherein processing the captured user interaction information according to configuration information to generate processed interaction information includes applying a transformation to captured user interaction information according to a set of transformation defined in the configuration information.

Clause 15. The method as recited in Clause 14, wherein the transformation is based on a time of use, a type of use or an assessment of success.

Clause 16. A method for managing user interaction information, the method comprising:
  obtaining captured user interaction information from at least one of a plurality of identified interaction devices associated with a facility;
  generating processed interaction information based on a transformation of the captured user interaction information defined in configuration information, the configuration information associating the processed captured user interaction information to at least one of a user profile or user account; and
  generating outputs associated with the processed interaction information according to configuration information, the outputs configured to elicit user interaction responsive to the captured user interaction with the identified device.

Clause 17. The method as recited in Clause 16 further comprising obtaining configuration information associating user interaction with identified devices from an external source.

Clause 18. The method as recited in Clause 16 further comprising transmitting the processed captured user interaction information to an external source.

Clause 19. The method as recited in Clause 16 wherein the outputs correspond to at least one of a video output or an audio output.

Clause 20. The method as recited in Clause 19, wherein the outputs include instructions generated to a user to elicit a user interaction.

Clause 21. A system for facilitating user interaction with devices, the system comprising:
  a controller implemented on computing device having a processor and a memory, wherein the controller executes computer-readable instructions that allow the controller to implement:
    an interface component for obtaining captured user interaction information from at least one of a plurality of devices, the captured user interaction information associated with an athletic activity;
    a configuration component for obtaining configuration information associating user interaction with identified devices of the plurality of devices;
    a user interaction component for processing captured user interaction information according to configuration information to generate processed interaction information;
    a facility interaction component for generating one or more physical outputs associated with the processed interaction information according to configuration information;
  wherein the user interaction component processes captured user interaction information associated with an identified device according to the configuration information corresponding to the identified device, the configuration information associating the captured user interaction information to at least one of a user profile or user account; and
  wherein the facility interaction component generates at least one output associated with user profile information associated with the identified device and at least one output based on the processed captured user interaction information to elicit user interaction responsive to the captured user interaction with the identified device.

Clause 22. The system as recited Clause 21, wherein the configuration component is further operable to transmit the associated captured user interaction to an external source.

Clause 23. The system as recited in Clause 21, wherein the configuration information is associated with preference categories for controlling user interaction information with the identified device.

Clause 24. The system as recited in Clause 21, wherein the configuration information is associated with one or more learning categories, the learning categories defining distinct levels of user interaction with the device.

Clause 25. A method for managing user interaction information, the method comprising:
  obtaining captured user interaction information from at least one of a plurality of identified interaction devices associated with a facility, the captured user interaction information associated with an athletic activity;
  processing the captured user interaction information according to configuration information to generate processed interaction information, the configuration information associating the captured user interaction information to at least one of a user profile or user account; and
  generating at least one output associated with user profile information associated with the identified interaction device and at least one output based on the processed captured user interaction information to elicit user interaction responsive to the captured user interaction with the identified device.

Clause 26. The method as recited in Clause 25 further comprising obtaining configuration information associating user interaction with identified devices from an external source.

Clause 27. The method as recited in Clause 25 further comprising transmitting the processed user interaction information to an external source.

Clause 28. The method as recited in Clause 27, wherein the transmitted processed user interaction information corresponds a measure of physical exertion.

Clause 29. The method as recited in Clause 25, wherein the configuration information is associated with one or more learning categories and wherein individual learning categories define unique associations between captured user interaction information.

Clause 30. The method as recited in Clause 28, wherein the individual learning categories include an exploration category, a growth category, a composition category, and a collaboration category.

Clause 31. The method as recited in Clause 25, wherein the captured user interaction information includes health vital data associated with the performance of the athletic activity.

Clause 32. The method as recited in Clause 30, wherein the one or more physical outputs include at least one of generating a three-dimensional visualization to elicit user interaction and indicative of the processed interaction information or generating video imagery data to elicit user interaction and indicative of the processed interaction information.

Clause 33. The method as recited in Clause 30, wherein processing the captured user interaction information according to configuration information to generate processed interaction information includes applying a transformation to captured user interaction information according to a set of transformation defined in the configuration information.

Clause 34. The method as recited in Clause 34, wherein the transformation is based on at least one of a time of use, a type of use or an assessment of success.

Clause 35. A method for managing user interaction information, the method comprising:
  obtaining captured user interaction information from at least one of a plurality of identified interaction devices associated with a facility, the captured user interaction information associated with an athletic activity;
  generating processed interaction information based on a transformation of the captured user interaction information defined in configuration information, the configuration information associating the processed captured user interaction information to at least one of a user profile or user account; and
  generating at least one output associated with user profile information associated with the identified device and at least one output based on the processed captured user interaction information to elicit user interaction responsive to the captured user interaction with the identified device.

Clause 36. The method as recited in Clause 35 further comprising obtaining configuration information associating user interaction with identified devices from an external source.

Clause 37. The method as recited in Clause 35 further comprising transmitting the processed captured user interaction information to an external source.

Clause 38. The method as recited in Clause 35 wherein the outputs correspond to at least one of a video output or an audio output.

Clause 39. The method as recited in Clause 38, wherein the outputs include instructions generated to a user to elicit a user interaction.

Clause 40. The method as recited in Clause 35, wherein the at least one of a plurality of identified interaction devices includes at least one interaction device associated with the athletic activity.

Clause 41. A system for facilitating user interaction with devices, the system comprising:
  a controller implemented on computing device having a processor and a memory, wherein the controller executes computer-readable instructions that allow the controller to implement:
    an interface component for obtaining captured user interaction information from at least one of a plurality of devices, the captured user interaction information associated with at least one of a mental or physical recovery activity by a user;
    a user interaction component for processing captured user interaction information according to configuration information to generate processed interaction information;
    a facility interaction component for generating one or more physical outputs associated with the processed interaction information according to configuration information;
  wherein the user interaction component processes captured user interaction information associated with an identified device according to the configuration information corresponding to the identified device, the configuration information associating the captured user interaction information to at least one of a user profile or user account; and
  wherein the facility interaction component generates at least one output based on the processed captured user interaction information to elicit user interaction responsive to the captured user interaction information.

Clause 42. The system as recited Clause 41, wherein the facility interaction component generates at least one output associated with at least one of user profile or user account information associated with the identified device.

Clause 43. The system as recited in Clause 41 further comprising a configuration component for obtaining configuration information associating user interaction.

Clause 44. The system as recited in Clause 43, wherein the configuration component is further operable to transmit the associated captured user interaction to an external source.

Clause 45. The system as recited in Clause 45, wherein the configuration information is associated with preference categories for controlling user interaction information with the identified device.

Clause 46. The system as recited in Clause 46, wherein the configuration information is associated with one or more learning categories, the learning categories defining distinct levels of user interaction with the device.

Clause 47. A method for managing user interaction information, the method comprising:
  obtaining captured user interaction information, the captured user interaction information associated with at least one of a mental or physical recovery activity by a user;
  processing the captured user interaction information according to configuration information to generate processed interaction information, the configuration information associating the captured user interaction information to at least one of a user profile or user account; and
  generating at least one output based on the processed captured user interaction information to elicit user interaction responsive to the captured user interaction information.

Clause 48. The method as recited in Clause 47 further comprising generating at least one output associated with user profile information associated with the at least one of a mental or physical recovery activity Clause 49. The method as recited in Clause 47 further comprising obtaining configuration information associating user interaction with identified devices from an external source.

Clause 50. The method as recited in Clause 47 further comprising transmitting the processed user interaction information to an external source.

Clause 51. The method as recited in Clause 47, wherein the transmitted processed user interaction information corresponds to a measure of physical exertion.

Clause 52. The method as recited in Clause 47, wherein the configuration information is associated with a set of learning categories and wherein individual learning categories define unique associations between captured user interaction information.

Clause 53. The method as recited in Clause 52, wherein the individual learning categories include an exploration category, a growth category, a composition category, and a collaboration category.

Clause 54. The method as recited in Clause 47 wherein the captured user interaction information includes health vital data associated with the performance of the at least one of a mental or physical recovery activity.

Clause 55. The method as recited in Clause 54, wherein generating at least one output includes at least one of generating a three-dimensional visualization to elicit user interaction and indicative of the processed interaction information or controlling a physical interactive device to elicit a physical response from the user.

Clause 56. The method as recited in Clause 54, wherein processing the captured user interaction information according to configuration information to generate processed interaction information includes applying a transformation to captured user interaction information according to a set of transformation defined in the configuration information.

Clause 57. The method as recited in Clause 57, wherein the transformation is based on at least one of a time of use a type of use or an assessment of success.

Clause 58. A method for managing user interaction information, the method comprising:

Clause 59. obtaining captured user interaction information associated with a facility, the captured user interaction information associated with at least one of a mental or physical recovery activity by a user;

generating processed interaction information based on a transformation of the captured user interaction information defined in configuration information, the configuration information associating the processed captured user interaction information to at least one of a user profile or user account; and generating at least one output based on the processed captured user interaction information to elicit user interaction responsive to the captured user interaction with the identified device.

Clause 60. The method as recited in Clause 58 further comprising transmitting the processed captured user interaction information to an external source.

Clause 61. The method as recited in Clause 58, wherein the at least one output includes instructions generated to a user to elicit a user interaction.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system for facilitating user interaction with devices, the system comprising:
　a plurality of facility interaction devices, wherein at least one individual facility interaction devices are configured, at least in part, to capture user interaction with devices to characterize both at least one physical state and at least one emotional state associated with an identified user, wherein capturing the user interaction includes capturing physical interaction with interaction devices based on at least visual images associated during use;
　a controller implemented on computing device having a processor and a memory, wherein the controller executes computer-readable instructions that allow the controller to implement:
　　an interface component that obtains information corresponding to captured user interaction information from at least one of the plurality of facility interaction devices, the captured user interaction information including images depicting physical interaction with interaction devices and emotional response to interaction devices;
　　a configuration component that obtains configuration information associating user interaction with identified devices;
　　a user interaction component that transforms captured physical interaction with interaction devices based at least on the visual images associated during use according to the configuration information to generate processed interaction information characterizing the physical interaction;
　　a facility interaction component that generates one or more physical outputs associated with the processed interaction information according to the configuration information; and
　wherein the user interaction component processes the captured user interaction information associated with an identified device according to the configuration information corresponding to the identified device, the configuration information associating with the captured user interaction information to at least one of a user profile or user account.

2. The system as recited claim 1, wherein the configuration component is further operable to transmit the associated captured user interaction to an external source.

3. The system as recited in claim 1, wherein the configuration information is associated with one or more learning categories and wherein individual learning categories define unique associations between captured user interaction information.

4. The system as recited in claim 3, wherein the configuration information is associated with a set of learning categories corresponding to sequential learning.

5. The system as recited in claim 1, wherein the one or more physical outputs correspond to at least one of a video output or an audio output.

6. A method for managing user interaction information, the method comprising:
　obtaining captured user interaction information from at least one of a plurality of identified interaction devices associated with a facility, wherein the captured user interaction information includes visual images associated during use, wherein the visual images depict both physical interaction with interaction devices and at least one emotional state of a user; and transforming the captured visual images depicting the physical interaction with the interaction devices and the at least one emotional state of the user according to user interaction information defined in configuration information to generate processed interaction information characterizing the physical interaction and the at least one emotional state of the user, the configuration information associating the captured user interaction information to at least one of a user profile or user account.

7. The method as recited in claim 6 further comprising obtaining configuration information associating user interaction with identified devices from an external source.

8. The method as recited in claim 6 further comprising transmitting the processed, user interaction information to an external source.

9. The method as recited in claim 6, wherein the configuration information is associated with one or more learning categories and wherein individual learning categories define unique associations between captured user interaction information.

10. The method as recited in claim 9, wherein the individual learning categories include an exploration category, a growth category, a composition category, and a collaboration category.

11. The method as recited in claim 6, further comprising generating one or more physical outputs associated with the processed interaction information according to the configuration information, the one or more physical outputs configured to elicit user interaction responsive to the captured user interaction with the identified device, wherein the one or more physical outputs correspond to at least one of a video output or an audio output.

12. The method as recited in claim 11, wherein the one or more physical outputs include generating a color to elicit user interaction and indicative of the processed interaction information.

13. The method as recited in claim 11, wherein the one or more physical outputs include video imagery data to elicit user interaction and indicative of the processed interaction information.

14. The method as recited in claim 11, wherein transforming the captured visual images depicting the physical interaction with the interaction devices includes applying a transformation to the captured user interaction information according to a set of transformation defined in the configuration information.

15. The method as recited in claim 14, wherein the transformation is based on a time of use, a type of use or an assessment of success.

16. A method for managing user interaction information, the method comprising:

obtaining captured user interaction information from at least one of a plurality of identified interaction devices associated with a facility, wherein the captured user interaction information includes capturing audio data and visual images associated during use to characterize at least one emotional state of a user; and transforming the captured visual images depicting the at least one emotional state of the user with the interaction devices according to the user interaction information defined in configuration information to generate processed user interaction information characterizing the at least one emotional state of a user, the configuration information associating the processed captured user interaction information to at least one of a user profile or user account.

17. The method as recited in claim 16 further comprising obtaining configuration information associating user interaction with identified devices from an external source.

18. The method as recited in claim 16 further comprising transmitting the processed captured user interaction information to an external source.

19. The method as recited in claim 16, further comprising generating outputs associated with the processed interaction information according to the configuration information, the outputs configured to elicit user interaction responsive to the captured user interaction with the identified device, wherein the outputs correspond to at least one of a video output or an audio output.

20. The method as recited in claim 19, wherein the outputs include instructions generated to a user to elicit a user interaction.

* * * * *

UNITED STATES PATENT AND TRADEMARK OFFICE
CERTIFICATE OF CORRECTION

PATENT NO. : 12,340,712 B1
APPLICATION NO. : 16/858322
DATED : June 24, 2025
INVENTOR(S) : Hiroshi Saijo et al.

Page 1 of 1

It is certified that error appears in the above-identified patent and that said Letters Patent is hereby corrected as shown below:

In the Specification

Column 29, Line 2, delete "recovery activity" and insert --recovery activity.--.

In the Claims

Column 30, Claim 2, Line 47, delete "as recited claim" and insert --as recited in claim--.

Signed and Sealed this
Nineteenth Day of August, 2025

Coke Morgan Stewart
*Acting Director of the United States Patent and Trademark Office*